(12) United States Patent
Hennessey et al.

(10) Patent No.: US 12,208,456 B2
(45) Date of Patent: Jan. 28, 2025

(54) METHOD OF MEDICAL TREATMENT FOR TRANSECTING A RING TRAPPED ON AN APPENDAGE OF A PATIENT

(71) Applicant: Ring Rescue Inc., Dartmouth (CA)

(72) Inventors: Patrick Hennessey, Dartmouth (CA); Brad MacKeil, Fletcher's Lake (CA); Scott Campbell, Halifax (CA); Joseph Ellsmere, Halifax (CA); Kevin Spencer, Bedford (CA)

(73) Assignee: Ring Rescue Inc., Dartmouth (CA)

( * ) Notice: Subject to any disclaimer, the term of this patent is extended or adjusted under 35 U.S.C. 154(b) by 0 days.

(21) Appl. No.: 18/422,767

(22) Filed: Jan. 25, 2024

(65) Prior Publication Data

US 2024/0157452 A1 May 16, 2024

Related U.S. Application Data

(63) Continuation of application No. 17/969,458, filed on Oct. 19, 2022, now abandoned.

(60) Provisional application No. 63/270,763, filed on Oct. 22, 2021.

(51) Int. Cl.
| | |
|---|---|
| *B23D 45/00* | (2006.01) |
| *B23D 45/16* | (2006.01) |
| *B23D 59/00* | (2006.01) |

(52) U.S. Cl.
CPC .......... *B23D 45/003* (2013.01); *B23D 45/16* (2013.01); *B23D 59/001* (2013.01)

(58) Field of Classification Search
CPC .. B23D 29/007; B23D 45/006; B23D 47/045; B23D 59/001; B23D 45/16; B25F 5/003
See application file for complete search history.

(56) References Cited

U.S. PATENT DOCUMENTS

| | | |
|---|---|---|
| 326,327 A | 9/1885 | Pickett |
| 328,154 A | 10/1885 | Thomas |
| 344,769 A | 6/1886 | Cronk |

(Continued)

FOREIGN PATENT DOCUMENTS

| | | |
|---|---|---|
| BE | 414226 A | 4/1936 |
| BE | 527967 A | 4/1954 |

(Continued)

OTHER PUBLICATIONS

Sattler Manufacturing, Medizintechnik Sattler GmbH, accessed Oct. 18, 2022 at <https://www.medizintechnik-sattler.de/en/content/sattlerr-manufacturing.

(Continued)

*Primary Examiner* — Ghassem Alie
*Assistant Examiner* — Samuel A Davies
(74) *Attorney, Agent, or Firm* — SMART & BIGGAR LP

(57) ABSTRACT

A method of medical treatment for transecting a ring trapped on an appendage of a patient is described. The method of medical treatment includes inserting a safety guard between the appendage and a portion of the ring, activating a blade motor to rotate a rotary blade aligned with the safety guard, sensing status readings, and transecting the portion of the ring including automatically directing a safety guard actuator to move the safety guard, based at least in part on the status readings, toward the rotary blade thereby urging the ring into contact with the rotary blade.

11 Claims, 11 Drawing Sheets

(56) References Cited

U.S. PATENT DOCUMENTS

| | | | |
|---|---|---|---|
| 551,366 A | 12/1895 | Cornwall | |
| 643,377 A | 2/1900 | Janney | |
| 653,557 A | 7/1900 | Jenkins | |
| 907,690 A | 12/1908 | Harbeck | |
| 1,017,545 A | 2/1912 | Hopkins | |
| 1,134,292 A | 4/1915 | Smith | |
| 1,316,252 A | 9/1919 | Moering | |
| 1,368,244 A | 2/1921 | Desrochers | |
| 1,687,773 A | 10/1928 | Kahlen | |
| 1,719,557 A | 7/1929 | Mcgrath | |
| 1,737,552 A | 12/1929 | Clay et al. | |
| 1,771,764 A | 7/1930 | Beattie | |
| 1,784,337 A | 12/1930 | Clarke et al. | |
| 1,813,693 A | 7/1931 | Balinski et al. | |
| 1,867,342 A | 7/1932 | Bruno | |
| 1,880,875 A | 10/1932 | Deutsch | |
| 1,885,188 A | 11/1932 | Deutsch | |
| 2,015,535 A | 9/1935 | Sacrey | |
| 2,139,272 A | 12/1938 | Jaworski | |
| 2,221,565 A | 11/1940 | Bailey | |
| 2,232,733 A | 2/1941 | Scarboro | |
| 2,291,470 A | 7/1942 | George | |
| 2,344,262 A | 3/1944 | Ernest et al. | |
| 2,352,432 A | 6/1944 | Harrington | |
| 2,366,017 A | 12/1944 | Fortune | |
| 2,367,432 A | 1/1945 | Frank | |
| 2,373,907 A | 4/1945 | Olson | |
| 2,375,364 A | 5/1945 | Hood | |
| 2,399,677 A | 5/1946 | Hood et al. | |
| 2,406,744 A | 9/1946 | Cryar | |
| 2,492,156 A | 12/1949 | Kupjack | |
| 2,659,969 A | 11/1953 | Martin | |
| 2,771,662 A | 11/1956 | Ziska | |
| 2,851,862 A | 9/1958 | Lohman | |
| 3,456,541 A | 7/1969 | Thompson et al. | |
| 3,610,299 A | 10/1971 | Jureit et al. | |
| 3,670,412 A | 6/1972 | Cunningham | |
| 3,710,445 A | 1/1973 | Roth | |
| 3,765,087 A | 10/1973 | Pawloski | |
| 3,910,142 A | 10/1975 | Jureit et al. | |
| 3,955,455 A | 5/1976 | Guzman | |
| 4,081,906 A | 4/1978 | Sigler | |
| 4,082,025 A | 4/1978 | Reinbacher | |
| 4,135,299 A | 1/1979 | Moriarty | |
| 4,267,636 A * | 5/1981 | Ducret | H02G 1/1297 30/90.3 |
| 4,411,067 A | 10/1983 | Kirk | |
| 4,506,445 A | 3/1985 | Esten | |
| 4,574,672 A | 3/1986 | Ehm et al. | |
| 4,602,536 A | 7/1986 | Fish | |
| 4,625,405 A | 12/1986 | Hudnutt et al. | |
| 4,794,273 A | 12/1988 | Mccullough et al. | |
| 4,864,730 A | 9/1989 | Weiss | |
| 4,976,034 A | 12/1990 | Whiteman | |
| 5,114,988 A | 5/1992 | Gagnon et al. | |
| 5,142,825 A * | 9/1992 | Floyd | B24B 23/00 7/157 |
| 5,172,479 A | 12/1992 | Keeton | |
| 5,179,551 A | 1/1993 | Turner | |
| 5,353,504 A | 10/1994 | Pai | |
| 5,365,625 A | 11/1994 | Han | |
| 5,369,886 A | 12/1994 | Gallatin | |
| 5,419,819 A | 5/1995 | Park | |
| 5,423,077 A | 6/1995 | Ueda | |
| 5,571,040 A | 11/1996 | Kawaguchi et al. | |
| 5,642,566 A | 7/1997 | Hirabayashi | |
| 5,672,253 A | 9/1997 | Hwang | |
| 5,681,204 A | 10/1997 | Kawaguchi et al. | |
| 5,875,554 A | 3/1999 | Vogelsanger | |
| 5,902,171 A | 5/1999 | Hamasaki et al. | |
| 5,987,754 A | 11/1999 | Hirabayashi et al. | |
| 6,044,564 A | 4/2000 | Jeltsch | |
| 6,092,290 A | 7/2000 | Vogelsanger | |
| 6,181,091 B1 | 1/2001 | Heeren et al. | |
| 6,294,006 B1 | 9/2001 | Andou | |
| 6,357,330 B1 * | 3/2002 | Dass | B28D 5/0064 83/73 |
| 6,468,183 B1 | 10/2002 | O'Neil et al. | |
| 6,553,880 B2 | 4/2003 | Jacobsen et al. | |
| 6,598,507 B1 | 7/2003 | Gunther et al. | |
| 6,659,098 B1 | 12/2003 | Sekiya | |
| 6,671,274 B1 | 12/2003 | Ding et al. | |
| 6,925,917 B2 | 8/2005 | Tilley et al. | |
| 6,973,727 B2 | 12/2005 | Yao | |
| 7,102,324 B2 | 9/2006 | Branecky et al. | |
| 7,116,071 B2 | 10/2006 | Glasgow et al. | |
| 7,172,640 B2 | 2/2007 | Berger et al. | |
| 7,178,436 B2 * | 2/2007 | Wilson | B23D 59/001 83/490 |
| 7,210,378 B1 | 5/2007 | Bibi | |
| 7,282,880 B2 | 10/2007 | Glasgow et al. | |
| 7,293,362 B2 | 11/2007 | Konen | |
| 7,331,109 B2 | 2/2008 | Tu | |
| 7,377,947 B2 | 5/2008 | Merker et al. | |
| 7,420,341 B2 | 9/2008 | Glasgow et al. | |
| 7,634,958 B2 | 12/2009 | Baugher | |
| 7,740,012 B2 | 6/2010 | Donnerdal et al. | |
| 7,757,630 B2 | 7/2010 | Yoshida et al. | |
| 7,833,367 B2 | 11/2010 | Yamamoto et al. | |
| 7,984,556 B2 | 7/2011 | Konen | |
| 8,051,572 B2 | 11/2011 | Zhang et al. | |
| 8,055,186 B2 | 11/2011 | Louchkoff et al. | |
| 8,066,283 B2 | 11/2011 | Yamada | |
| 8,069,572 B2 | 12/2011 | Dreher | |
| 8,122,607 B2 | 2/2012 | Maniwa et al. | |
| 8,168,023 B2 | 5/2012 | Chapman et al. | |
| 8,181,012 B2 | 5/2012 | Ono | |
| 8,261,453 B2 | 9/2012 | Huang | |
| 8,316,548 B2 | 11/2012 | Dreher | |
| 8,347,769 B2 | 1/2013 | Walter | |
| 8,353,232 B2 | 1/2013 | Walter et al. | |
| 8,559,406 B2 | 10/2013 | Lundby et al. | |
| 8,602,287 B2 | 12/2013 | Yates et al. | |
| 8,661,737 B1 | 3/2014 | Brogan | |
| 8,683,704 B2 | 4/2014 | Scott et al. | |
| 8,701,294 B2 | 4/2014 | Bruce et al. | |
| 8,758,342 B2 | 6/2014 | Bales et al. | |
| 8,773,024 B2 | 7/2014 | Yan et al. | |
| 8,813,370 B2 | 8/2014 | Pellenc | |
| 8,834,485 B2 | 9/2014 | Kave | |
| 8,918,923 B2 | 12/2014 | Song | |
| 9,041,002 B2 | 5/2015 | Lv | |
| 9,102,047 B2 | 8/2015 | Park | |
| 9,108,662 B2 | 8/2015 | Scholin | |
| 9,120,235 B2 | 9/2015 | Maniwa | |
| 9,231,386 B2 | 1/2016 | Kochi et al. | |
| 9,307,982 B2 | 4/2016 | Gorek et al. | |
| 9,320,516 B2 | 4/2016 | Gorek et al. | |
| 9,339,938 B2 | 5/2016 | Winkel et al. | |
| 9,414,653 B1 | 8/2016 | Morton | |
| 9,433,408 B2 | 9/2016 | Gorek et al. | |
| 9,451,949 B2 | 9/2016 | Gorek et al. | |
| 9,481,122 B2 | 11/2016 | Hurt et al. | |
| 9,486,864 B2 | 11/2016 | Luo et al. | |
| 9,524,543 B2 | 12/2016 | Nava et al. | |
| 9,572,568 B2 | 2/2017 | Gorek et al. | |
| 9,675,372 B2 | 6/2017 | Laurent et al. | |
| 9,676,042 B2 | 6/2017 | Miller et al. | |
| 9,706,834 B1 | 7/2017 | Taylor | |
| 9,757,868 B2 | 9/2017 | Winkel et al. | |
| 9,757,869 B1 | 9/2017 | Wada et al. | |
| 9,801,336 B2 | 10/2017 | Palmute | |
| 9,820,445 B2 | 11/2017 | Simpson et al. | |
| 9,826,975 B2 | 11/2017 | Gorek et al. | |
| 9,832,936 B2 | 12/2017 | Ishiguro | |
| 9,888,632 B2 | 2/2018 | Zhou et al. | |
| 9,901,496 B1 | 2/2018 | Alvine et al. | |
| 9,908,445 B2 | 3/2018 | Lee et al. | |
| 9,936,948 B2 | 4/2018 | Gorek et al. | |
| 9,950,418 B2 | 4/2018 | Kakiuchi et al. | |
| 9,962,780 B2 | 5/2018 | Chen et al. | |
| 10,091,947 B2 | 10/2018 | Pellenc | |
| 10,098,632 B2 | 10/2018 | Gorek et al. | |
| 10,166,616 B2 | 1/2019 | Chen et al. | |

(56) References Cited

U.S. PATENT DOCUMENTS

| | | |
|---|---|---|
| 10,168,917 B2 | 1/2019 | Dai et al. |
| 10,172,292 B2 | 1/2019 | Zador et al. |
| 10,172,897 B2 | 1/2019 | Vu et al. |
| 10,179,415 B2 | 1/2019 | Landwehr |
| 10,245,660 B2 | 4/2019 | Myrfield |
| 10,309,551 B2 | 6/2019 | Fiedziuk |
| 10,350,771 B2 | 7/2019 | Perlberg et al. |
| 10,391,646 B2 | 8/2019 | Holmes |
| 10,413,974 B2 | 9/2019 | Koslowski et al. |
| 10,433,630 B2 | 10/2019 | Besen et al. |
| 10,442,100 B2 | 10/2019 | Yore, Jr. et al. |
| 10,641,993 B1 | 5/2020 | Ning |
| 10,689,474 B2 | 6/2020 | Takada et al. |
| 10,733,736 B2 | 8/2020 | Smith |
| 10,744,634 B2 | 8/2020 | Kakiuchi et al. |
| 10,762,141 B2 | 9/2020 | Liang et al. |
| 10,779,628 B2 | 9/2020 | Mcmullen |
| 10,813,635 B2 | 10/2020 | Gorek et al. |
| 10,875,170 B2 | 12/2020 | Numata |
| 10,912,259 B2 | 2/2021 | Zador et al. |
| 10,913,174 B2 | 2/2021 | Nakashima |
| 10,984,453 B2 | 4/2021 | Box et al. |
| 10,996,564 B2 | 5/2021 | Finlay et al. |
| 11,046,548 B2 | 6/2021 | Nasu |
| 11,059,114 B2 | 7/2021 | Karlsson |
| 11,123,891 B2 | 9/2021 | Supe-Dienes |
| 11,125,845 B2 | 9/2021 | Sharma |
| 11,179,860 B2 | 11/2021 | Sandefur et al. |
| 11,219,957 B2 | 1/2022 | Numata |
| 11,259,797 B2 | 3/2022 | Gorek et al. |
| 11,273,550 B2 | 3/2022 | Freitag |
| 11,305,405 B2 | 4/2022 | Almqvist et al. |
| 11,338,426 B2 | 5/2022 | Rudolph |
| 11,358,297 B2 | 6/2022 | Pellenc et al. |
| 11,383,174 B2 | 7/2022 | Manuel |
| 11,383,370 B2 | 7/2022 | Wiwatowski et al. |
| 11,394,679 B2 | 7/2022 | Brezina et al. |
| 11,400,531 B2 | 8/2022 | Karlsson |
| 11,432,998 B2 | 9/2022 | Cheskin et al. |
| 11,440,110 B2 | 9/2022 | Ishikawa et al. |
| 11,486,260 B2 | 11/2022 | Pearson |
| 11,491,806 B2 | 11/2022 | Condello et al. |
| 11,534,930 B2 | 12/2022 | Lu |
| 11,537,952 B2 | 12/2022 | Avare |
| 11,548,082 B2 | 1/2023 | Qu |
| 11,565,433 B2 | 1/2023 | Ma |
| 11,577,473 B2 | 2/2023 | Puchleitner et al. |
| 11,589,552 B2 | 2/2023 | Brown et al. |
| 11,633,181 B2 | 4/2023 | Gorek et al. |
| 11,654,496 B2 | 5/2023 | Koslowski et al. |
| 2003/0000716 A1 | 1/2003 | Hofmann et al. |
| 2003/0163921 A1 | 9/2003 | Tsai |
| 2004/0035005 A1 | 2/2004 | Huang et al. |
| 2004/0055164 A1 | 3/2004 | Molins |
| 2004/0118257 A1 | 6/2004 | Kratzmaier |
| 2005/0115081 A1 | 6/2005 | Tu |
| 2006/0248730 A1 | 11/2006 | Miller et al. |
| 2007/0209209 A1 | 9/2007 | Davis et al. |
| 2008/0010839 A1 | 1/2008 | Eby et al. |
| 2008/0263872 A1 | 10/2008 | Ferk et al. |
| 2009/0133554 A1 | 5/2009 | Pan |
| 2010/0024223 A1 | 2/2010 | Lehman et al. |
| 2010/0071218 A1 | 3/2010 | Poole et al. |
| 2010/0076474 A1 | 3/2010 | Yates et al. |
| 2010/0077621 A1 | 4/2010 | Quigley et al. |
| 2010/0186235 A1 | 7/2010 | Schwartz et al. |
| 2010/0192383 A1 | 8/2010 | Ishiguro |
| 2011/0048198 A1 | 3/2011 | Watanabe et al. |
| 2011/0056084 A1 | 3/2011 | Okada et al. |
| 2011/0061242 A1 | 3/2011 | Chen et al. |
| 2011/0172689 A1 | 7/2011 | Smith et al. |
| 2011/0174122 A1 | 7/2011 | Braun et al. |
| 2013/0055574 A1 | 3/2013 | Nie et al. |
| 2013/0284785 A1 | 10/2013 | Brosius |
| 2013/0318800 A1 | 12/2013 | Weiss et al. |
| 2013/0333228 A1 | 12/2013 | Ota et al. |
| 2014/0157522 A1 | 6/2014 | Lorini |
| 2014/0223746 A1 | 8/2014 | Schwartz et al. |
| 2014/0331833 A1 | 11/2014 | Gass et al. |
| 2015/0148833 A1* | 5/2015 | Stokes ............ A61B 17/320068 |
| 2015/0328790 A1 | 11/2015 | Kasperek |
| 2016/0150738 A1 | 6/2016 | Hall |
| 2016/0368125 A1 | 12/2016 | Kim |
| 2017/0008102 A1 | 1/2017 | Ishikawa et al. |
| 2018/0036906 A1 | 2/2018 | Frolov |
| 2018/0326601 A1 | 11/2018 | Sandefur et al. |
| 2018/0345433 A1* | 12/2018 | Sudo ..................... B23Q 11/04 |
| 2019/0210206 A1 | 7/2019 | Nix |
| 2019/0255630 A1 | 8/2019 | Rodriquez et al. |
| 2019/0329337 A1 | 10/2019 | Owens et al. |
| 2020/0001496 A1* | 1/2020 | Bindhammer ....... B23D 59/003 |
| 2020/0030999 A1 | 1/2020 | Sandefur et al. |
| 2020/0070261 A1 | 3/2020 | Gore |
| 2020/0100958 A1 | 4/2020 | Wiznia |
| 2020/0347991 A1 | 11/2020 | Pellenc et al. |
| 2020/0385229 A1 | 12/2020 | Kim |
| 2021/0101239 A1 | 4/2021 | Lawenius et al. |
| 2021/0252656 A1 | 8/2021 | Lawenius et al. |
| 2021/0339410 A1 | 11/2021 | Hayashi et al. |
| 2022/0143855 A1 | 5/2022 | Barnes |
| 2022/0297327 A1 | 9/2022 | Jenter |
| 2022/0312680 A1 | 10/2022 | Nii |
| 2022/0314417 A1 | 10/2022 | Kamiya |
| 2022/0314418 A1 | 10/2022 | Kamiya |
| 2022/0314419 A1 | 10/2022 | Kamiya |
| 2022/0339770 A1 | 10/2022 | Wiwatowski et al. |
| 2022/0347770 A1 | 11/2022 | Koslowski et al. |
| 2022/0355399 A1 | 11/2022 | Koslowski et al. |
| 2022/0355402 A1 | 11/2022 | Koslowski et al. |
| 2022/0410293 A1 | 12/2022 | Belanger |
| 2023/0089563 A1 | 3/2023 | Rudolf et al. |
| 2023/0131317 A1 | 4/2023 | Hennessey et al. |

FOREIGN PATENT DOCUMENTS

| | | | |
|---|---|---|---|
| CA | 1213134 A1 | 10/1986 | |
| CA | 1213209 A1 | 10/1986 | |
| CA | 2276054 A1 | 7/1998 | |
| CA | 2850801 A1 | 8/2005 | |
| CA | 2656592 A1 | 1/2008 | |
| CA | 2276054 C | 11/2008 | |
| CA | 2714773 A1 | 3/2011 | |
| CA | 2787348 A1 | 7/2011 | |
| CA | 2714773 C | 5/2014 | |
| CA | 2915812 A1 | 12/2014 | |
| CA | 2787348 C | 5/2015 | |
| CA | 2945344 A1 | 10/2015 | |
| CA | 2915812 C | 7/2017 | |
| CA | 3151710 A1 | 3/2021 | |
| CA | 2945344 C | 11/2022 | |
| CA | 3123277 A1 | 12/2022 | |
| CH | 249741 A | 7/1947 | |
| CH | 558172 A | 1/1975 | |
| CN | 201410644 Y | 2/2010 | |
| CN | 102463590 A | 5/2012 | |
| CN | 107307946 A | 11/2017 | |
| CN | 209886798 U | 1/2020 | |
| CN | 213646122 U | 7/2021 | |
| DE | 19934290 A1 | 1/2001 | |
| DE | 202004004606 U1 | 7/2004 | |
| DE | 202010006440 B4 | 1/2006 | |
| DE | 102004014393 B3 | 11/2007 | |
| DE | 102006051689 A1 | 2/2012 | |
| DE | 202012000500 U1 | 4/2012 | |
| DE | 202018100881 U1 | 3/2018 | |
| FR | 2514637 A1 | 4/1983 | |
| GB | 143447 A | 5/1920 | |
| GB | 2249273 A | 4/1994 | |
| GB | 2460738 A | 7/2009 | |
| GB | 2466383 A | 3/2014 | |
| GB | 2521823 B | 9/2019 | |
| KR | 970000474 B1 | 1/1997 | |
| KR | 200388187 Y1 | 6/2005 | |
| KR | 100968497 B1 | 11/2009 | |

(56) References Cited

FOREIGN PATENT DOCUMENTS

| KR | 20110019410 A | 2/2011 |
|----|---------------|--------|
| KR | 101052497 B1 | 9/2011 |
| WO | 2014086376 A2 | 6/2014 |
| WO | 2021062233 A1 | 4/2021 |
| WO | 2022266756 A1 | 12/2022 |

OTHER PUBLICATIONS

"Vintage Beaver Finger Ring Cutter with Spare Saw Blade and Instructions Sheet" Product Page, accessed Oct. 18, 2022 at <https://www.worthpoint.com/worthopedia/vintage-beaver-finger-ring-cutter-252720636>.

"Beaver Ring Cutter Ring Cutting Made Easy!" Product Page, QTE North America Inc., accessed Oct. 18, 2022 at <https://qtena.com/beaver-ring-cutter-br-ring-cutting-made-easy-br-4100-p-5062.html>.

"Haicable Manual Hydraulic Rebar Cutter SC-10 Hand Rebar Cutting Tools for Cutting Rebar Max Dia. 10mm" Product Page, Amazon.ca, accessed Oct. 18, 2022 at <https://www.amazon.ca/Haicable-Manual-Hydraulic-Cutting-Dia-10mm/dp/B0117J6OVQ>.

"Hand Tool Ergonomics" OSH Answers Fact Sheets, CCOHS, accessed Oct. 18, 2022 at <https://www.ccohs.ca/oshanswers/ergonomics/handtools/tooldesign.html>.

"Gem II Battery Powered Ring Cutter Kit with Recharger Unit" Product Page, A-Z Tec Medical Ltd, accessed Oct. 19, 2022 at <http://www.aztecmedical.co.uk/gem_II_ring_cutter_kit_r.html>.

International Search Report and Written Opinion mailed Dec. 28, 2022 in International Patent Application No. PCT/CA2022/051540 (14 pages).

\* cited by examiner

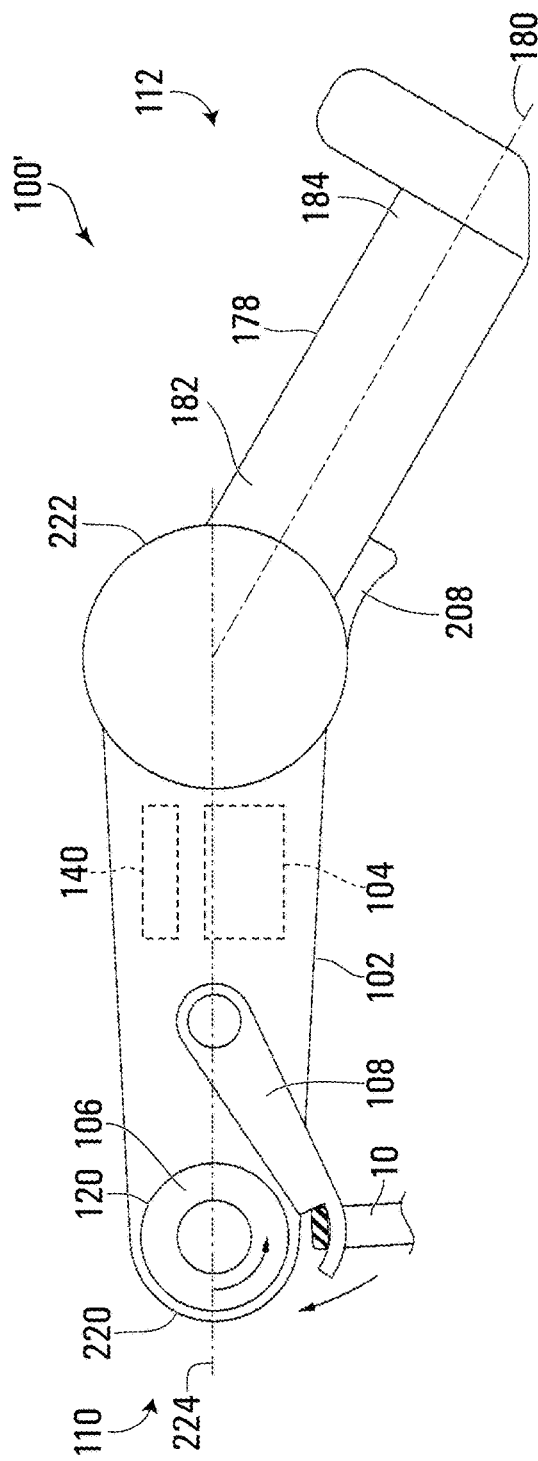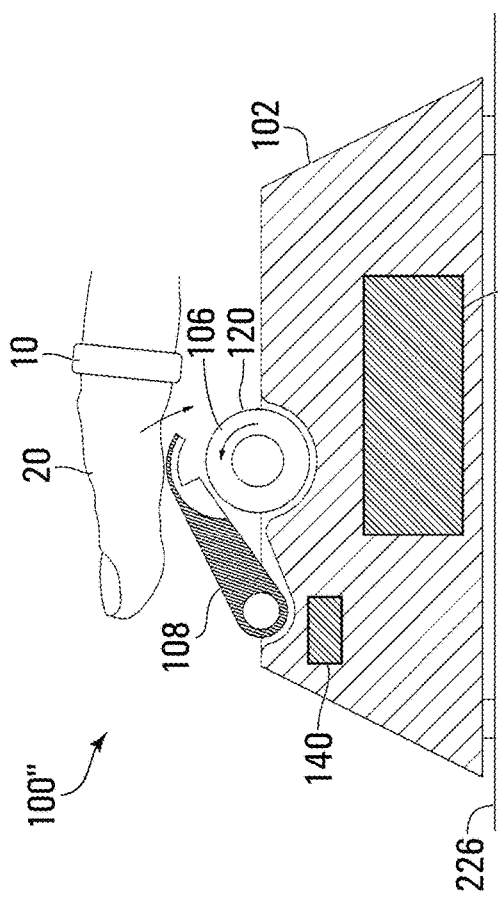

METHOD OF MEDICAL TREATMENT FOR TRANSECTING A RING TRAPPED ON AN APPENDAGE OF A PATIENT

CROSS-REFERENCE TO RELATED APPLICATIONS

This application is a continuation of U.S. application Ser. No. 17/969,458 filed Oct. 19, 2022, which claims the benefit of priority to U.S. Provisional Application No. 63/270,763, filed Oct. 22, 2021, the contents of which is incorporated herein by reference in their entirety.

FIELD

This disclosure relates generally to devices for removing stuck rings or other jewelry, and more particularly to ring cutters for safely transecting a ring trapped on an appendage (e.g., a digit, thumb, toe, or penis).

INTRODUCTION

Removing hand/foot jewelry is commonplace in hospital emergency rooms around the world. Rings must be removed from the digits of patients in many, if not most cases where there is swelling of the digit, and/or swelling of the associated hand/foot or arm/leg. In cases where rings cannot be removed easily, the process of removal may be time-consuming, and in some cases may risk the health of the patient.

In the event that a ring is not easily removable from a patient's swollen digit, there are two widely accepted methods for removal of the ring: the 'ring cutter method' and the 'string method'. In the ring cutter method, the ring is cut using e.g., a small rotary saw, and then mechanically deformed to remove it from the digit. In the string method, string, or an elastic constrictive material (e.g., a penrose drain) is wrapped tightly around a swollen digit to compress the digit, in an effort to decrease the swelling sufficiently so that the ring can be removed by sliding the ring towards and ultimately past the distal end of the digit.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a ring cutter for safely transecting a ring trapped on an appendage. The ring cutter includes: a) a body; b) a blade motor housed in the body; c) a circular blade drivingly connected to the blade motor, the blade having a blade rotation axis and a peripheral cutting edge; d) a guard coupled to the body and insertable between the ring and the appendage to position the ring between the guard and the blade; e) a guard actuator drivingly connected to the guard and controlling a movement of the guard; f) a current sensor positioned to sense electrical current associated with the blade motor; and g) one or more processors communicatively coupled to the current sensor and the guard actuator, wherein the one or more processors are configured to collectively:
  i) receive, from the current sensor, an electrical current reading associated with the blade motor, and
  ii) transmit, to the guard actuator, one or more commands to control the movement of the guard based at least on the electrical current reading.

In accordance with another broad aspect, there is provided a ring cutter for safely transecting a ring trapped on an appendage. The ring cutter includes: a) a body; b) a blade motor housed in the body; c) a circular blade drivingly connected to the blade motor, the blade having a blade rotation axis and a peripheral cutting edge; d) a guard coupled to the body and insertable between the ring and the appendage to position the ring between the guard and the blade; e) a guard actuator drivingly connected to the guard and controlling a movement of the guard between at least a cutting start position and a cutting finished position; f) a position sensor located to sense a position associated with the guard; g) a cutting progress indicator associated with the movement of the guard between the cutting start and cutting finished positions; and h) one or more processors communicatively coupled to the position sensor and the cutting progress indicator, wherein the one or more processors are configured to collectively:
  i) receive, from the position sensor, a position signal associated with the guard; and
  ii) direct the cutting progress indicator to update based on the position signal.

In accordance with another broad aspect, there is provided a ring cutter for safely transecting a ring trapped on an appendage. The ring cutter includes: a) a body; b) a blade motor housed in the body; c) a circular blade drivingly connected to the blade motor, the blade having a blade rotation axis and a peripheral cutting edge; d) a guard coupled to the body and insertable between the ring and the appendage to position the ring between the guard and the blade; e) a temperature sensor positioned to sense a temperature associate with the guard; and f) one or more processors communicatively coupled to the temperature sensor and the blade motor, wherein, the one or more processors are configured to collectively:
  i) receive, from the temperature sensor, a temperature reading associated with the guard, and
  ii) direct a speed of the blade motor based at least in part on the temperature reading.

In accordance with another broad aspect, there is provided a ring cutter for safely transecting a ring trapped on an appendage. The ring cutter includes: a) a body; b) a blade motor housed in the body; c) a circular blade drivingly connected to the blade motor, the blade having a blade rotation axis and a peripheral cutting edge; d) a guard coupled to the body and insertable between the ring and the appendage to position the ring between the guard and the blade; e) a guard actuator drivingly connected to the guard and controlling a movement of the guard; f) a temperature sensor positioned to sense a temperature associated with the guard; and g) one or more processors communicatively coupled to the temperature sensor and the guard actuator, wherein, the one or more processors are configured to collectively:
  i) receive, from the temperature sensor, a temperature reading associated with the guard, and
  ii) transmit, to the guard actuator, one or more commands to control the movement of the guard based at least on the temperature reading.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 8 is a cross-sectional view of a ring cutter, in accordance with another embodiment;

FIG. 9 is a side view of a ring cutter, in accordance with another embodiment; and FIG. 10 is a schematic illustration of a ring removal kit that includes a compression device and a ring cutter for respectively freeing and transecting a ring trapped on an appendage.

Figure 1:
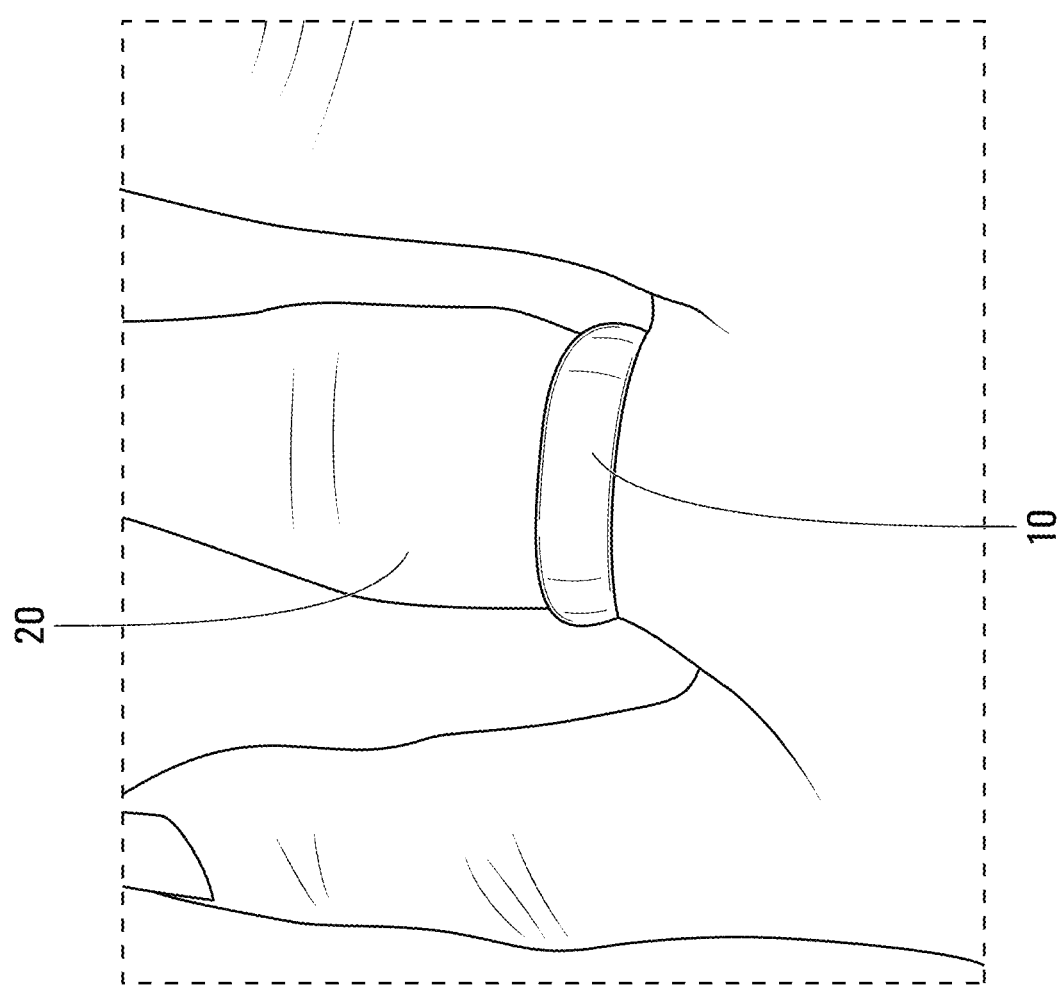
FIG. 1 is an example of a ring "stuck" on a swollen finger.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "an embodiment", "embodiment", "embodiments", "the embodiment", "the embodiments", "one or more embodiments", "some embodiments", and "one embodiment" mean "one or more (but not all) embodiments of the present invention(s)", unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a first element is said to be 'communicatively coupled to' or 'communicatively connected to' or 'connected in communication with' a second element where the first element is configured to send or receive electronic signals (e.g., data) to or from the second element, and the second element is configured to receive or send the electronic signals from or to the first element. The communication may be wired (e.g., the first and second elements are connected by one or more data cables), or wireless (e.g., at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g., SPI, $I^2C$, Bluetooth™' or IEEE™ 802.11).

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g., 112a, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., 112).

Removing jewelry trapped on appendages is commonplace in hospital emergency rooms around the world. As an example, FIG. 1 depicts a ring 10 that is 'stuck' on a swollen finger 20, in that it cannot be removed by pulling or otherwise mechanically urging the ring towards the distal end of the finger without injuring the finger and/or causing significant pain or discomfort. In other cases, a ring or band may become stuck on different appendages, such as, e.g., thumbs, toes, and genitalia (e.g. penis). Rings must be removed from such appendages in many, if not most cases where there is swelling of that appendage.

FIGS. 2A-2D illustrate a ring cutter, referred to generally as 100, that may be used to safely transect a ring trapped on an appendage. The ring cutter 100 has opposed front and rear ends 110, 112, and opposed upper and lower ends 114, 116. As shown, the ring cutter 100 includes a body 102, a blade motor 104 (FIG. 3) housed in the body 102, a circular blade 106 drivingly connected to the blade motor 104, and an appendage guard 108 coupled to the body 102.

The blade 106 has a blade rotation axis 118 and a peripheral cutting edge 120. Rotation of the blade 106 about the blade rotation axis 118 is driven by the blade motor 104. The blade 106 may be provided in any suitable position for cutting. In the illustrated embodiment, the blade 106 is positioned proximate to the front end 110 of the ring cutter 100. Such arrangement may improve safety as it locates the blade 106 away from the operator. The blade 106 may have any suitable diameter. In some embodiments, the blade diameter may be between 5 and 100 mm. Preferably, the blade diameter is between 10 and 50 mm, and more preferably between 20 and 30 mm.

Figure 2A:
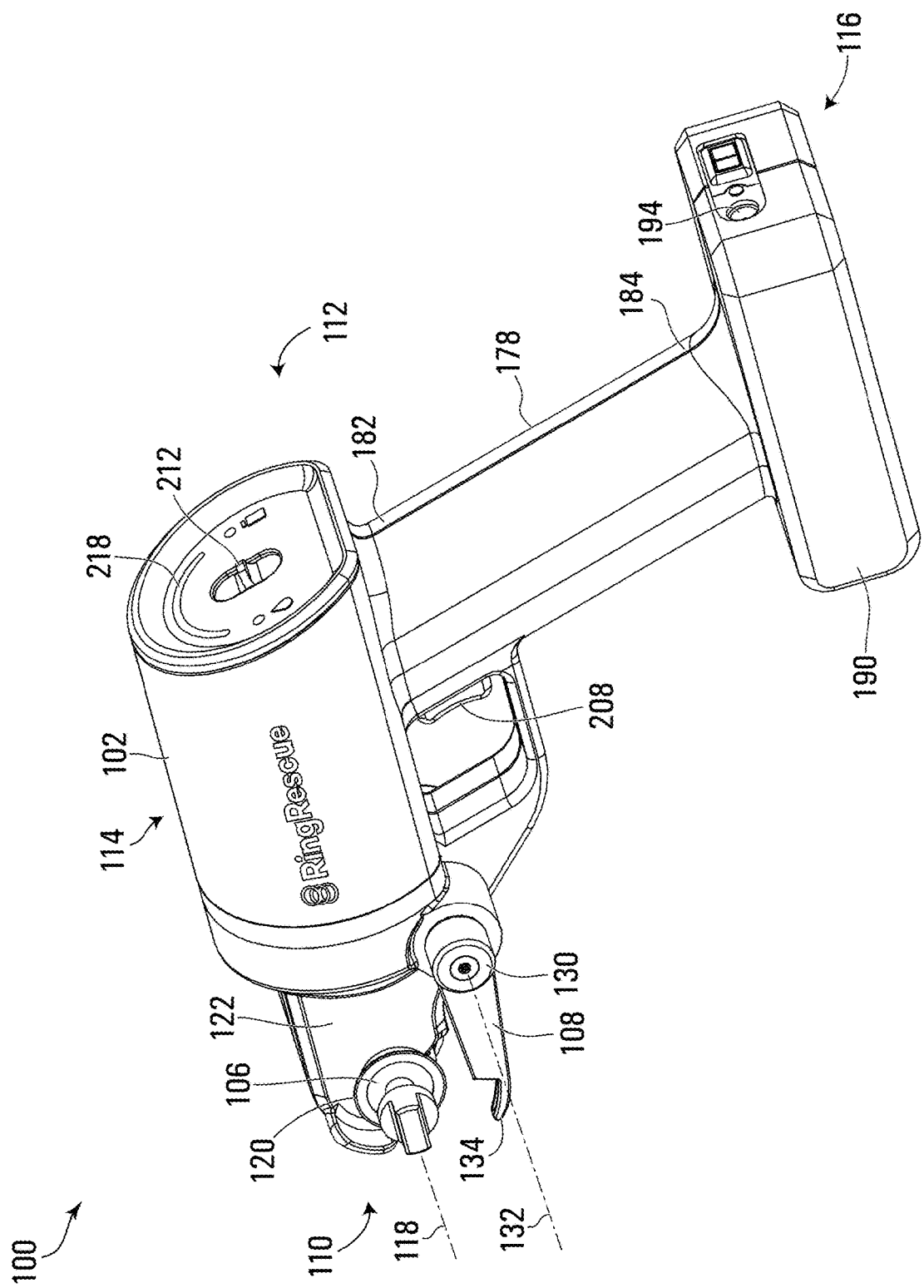
FIG. 2A is rear perspective view of a ring cutter, in accordance with an embodiment.
Figure 2B:
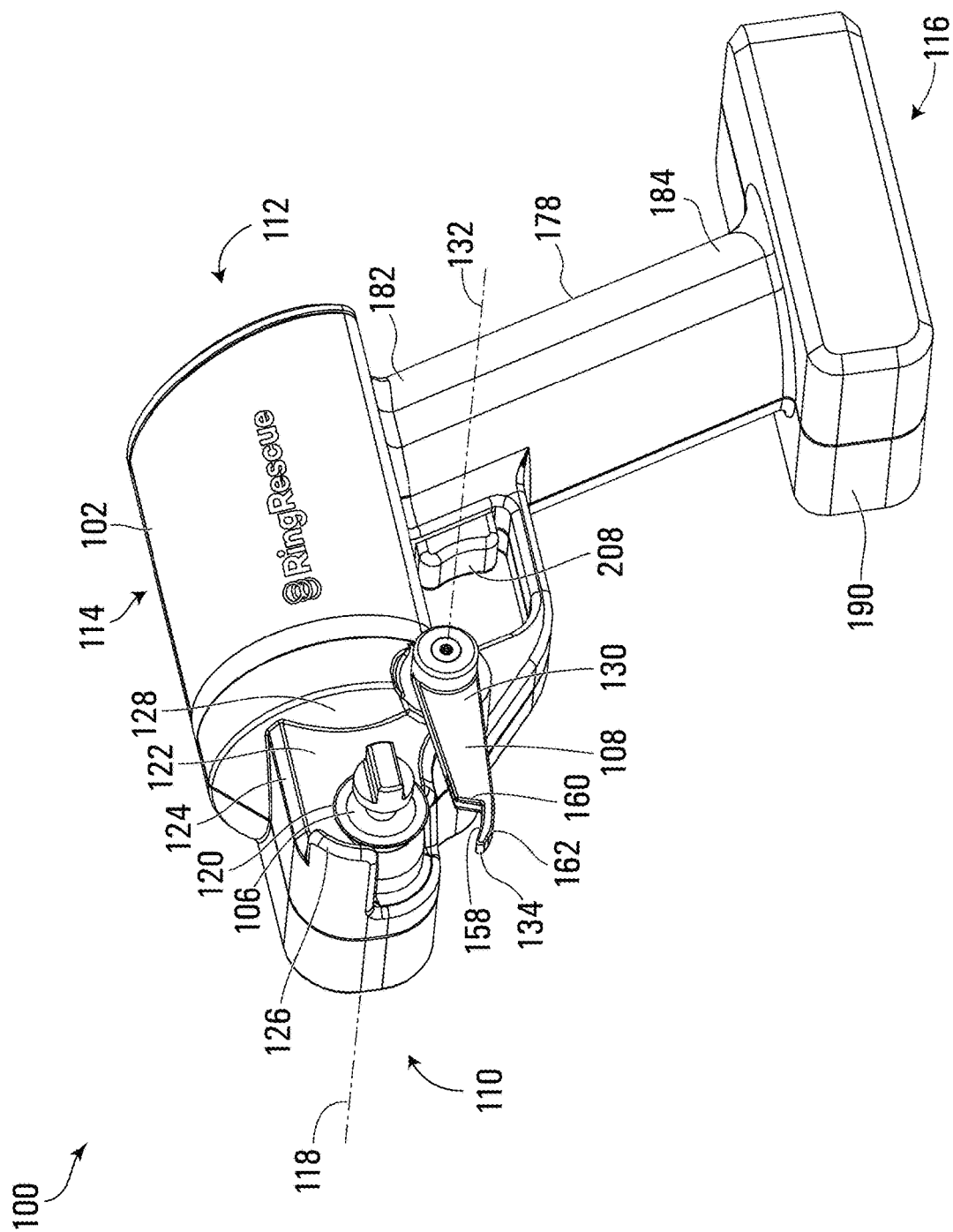
FIGS. 2B-2D are respective front perspective, side and rear views of the ring cutter of FIG. 2A.

In the illustrated embodiment, the body 102 includes a recessed portion 122 in which the blade 106 is seated. As shown in FIG. 2B, the body 102 has upper, front, and rear blade shields 124, 126, 128 that partially bound the recessed portion 122 and extend past the plane of the blade 106. Accordingly, positioning the blade 106 in the recessed portion 122 may protect the patient and/or operator from making inadvertent contact with the peripheral cutting edge 120 of the blade 106 (i.e., the upper, front, and rear blade shields 124, 126, 128 may block such inadvertent contact). The recessed portion 122 of the body 102 may also protect the blade 106 from damage in the event the ring cutter 100 is dropped. In alternative embodiments, the body 102 may not include a recessed portion 122 for the blade 106.

The guard 108 is insertable between a ring and an appendage to position the ring between the guard 108 and the blade 106. As an example, the guard 108 may be inserted between the ring 10 that is stuck on the swollen finger 20 (e.g., see FIG. 1). Once the guard 108 is inserted, the ring 10 is positioned between the guard 108 and the peripheral cutting edge 120 of the blade 106. In such an arrangement, movement of the guard 108 toward the blade 106 moves the ring 10 towards the blade 106. During a cutting process, the guard 108 can be moved relative to the blade 106 to supply a cutting pressure between the ring 10 and the blade 106 (i.e., the guard 108 presses the ring 10 into the peripheral cutting edge 120 of the blade 106). The guard 108 can be moved toward the blade 106 to increase the applied cutting pressure or away from the blade 106 to decrease the applied cutting pressure. Owing to its position between the appendage and the blade 106, the guard 108 protects the appendage from being cut by the blade 106.

In some embodiments, the guard 108 may be moved manually toward or away from the blade 106. For example, the operator may supply a force to the guard 108 that causes the guard 108 to move toward or away from the blade 106 depending on the direction of the force. Alternatively, or in addition, the guard 108 may be moved manually via user interaction with a remote lever, slider, trigger, knob, or the like. In other embodiments, the guard 108 is not manually movable.

The guard 108 can be connected to the body 102 in any manner that allows the guard 108 to be moved toward and away from the peripheral cutting edge 120 of the blade 106. For example, the guard 108 may be connected to the body 102 in a manner that allows guard 108 to translate (e.g., slide) or rotate (e.g., pivot) toward and away from the peripheral cutting edge 120. In one embodiment, the guard 108 may be connected to the body 102 by a telescopic cylinder (not shown) that is moveable (e.g., in translation) between retracted and extended positions. In this embodiment, the movement of the telescopic cylinder between the retracted and extended positions moves the guard 108 toward and away from the peripheral cutting edge 120 of the blade 106.

In the illustrated embodiment, the guard 108 is pivotably connected to the body 102. As shown, the guard 108 has a guard proximal end 130 pivotably connected to the body 102 at a guard pivot axis 132, and a guard distal end 134 spaced apart from the guard proximal end 130. The guard distal end 134 is insertable between the ring and the appendage to position the ring between the guard 108 and the blade 106. Pivoting the guard 108 about the guard pivot axis 132, toward the blade 106, moves the guard distal end 134 closer to the peripheral cutting edge 120 of the blade 106. Conversely, pivoting the guard 108 about the guard pivot axis 132, away from the blade 106, moves the guard distal end 134 away from the peripheral cutting edge 120 of the blade 106.

Figure 2C:
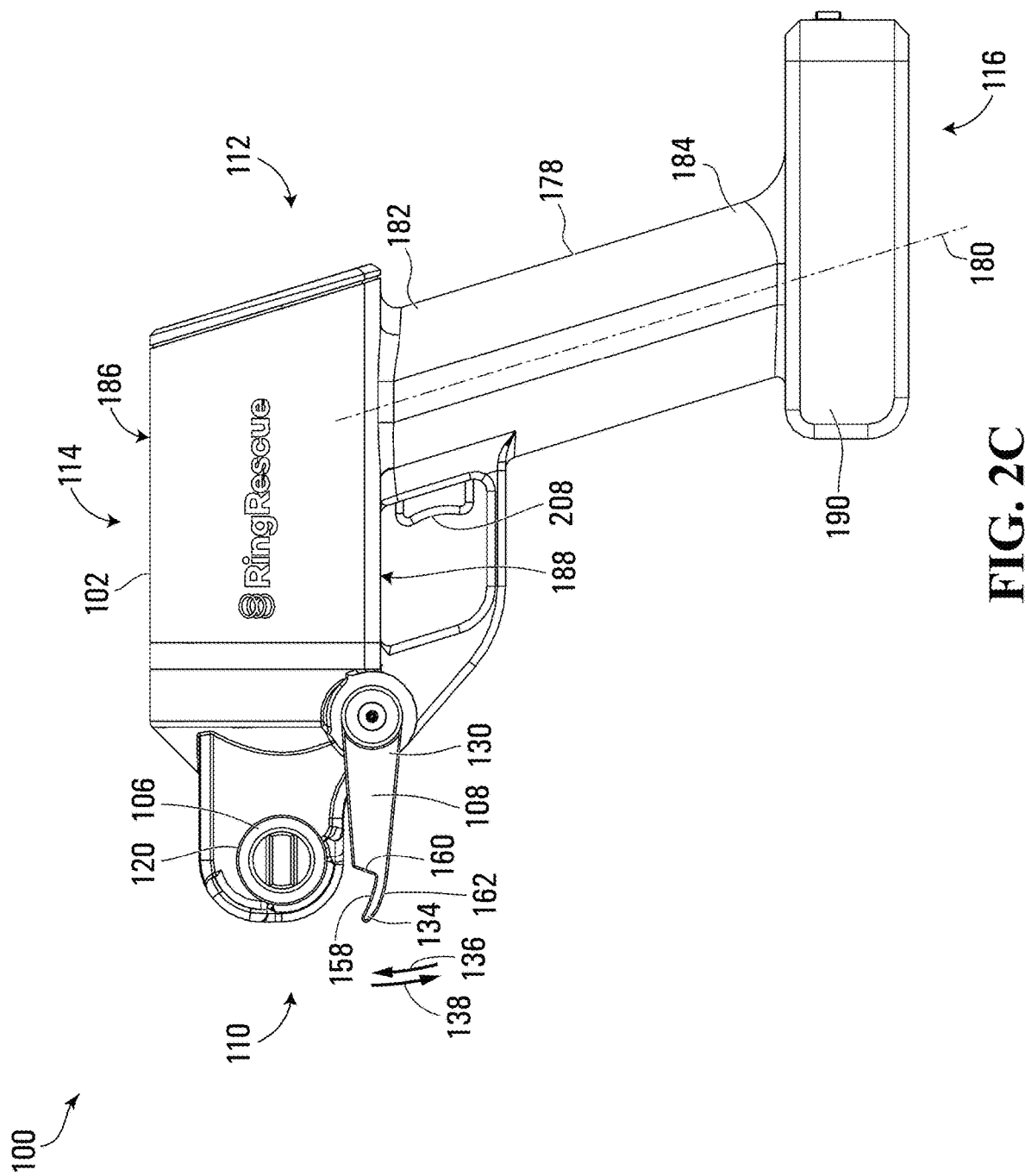

Referring to FIG. 2C, the guard 108 is pivotable about the guard pivot axis 132 in a guard closing direction 136 and an opposed guard opening direction 138. Pivoting the guard 108 in the guard closing direction 136 moves the guard distal end 134 toward the peripheral cutting edge 120 of the blade 106. The guard 108 may be pivoted in the guard closing direction 136 to increase the pressure between the ring and the peripheral cutting edge 120 of the blade 106. Conversely, pivoting the guard 108 in the guard opening direction 138 moves the guard distal end 134 away from the peripheral cutting edge 120 of the blade 106. The guard 108 may be pivoted in the guard opening direction 138 to decrease the pressure between the ring and the peripheral cutting edge 120 of the blade 106.

In some embodiments, the guard 108 may be pivoted manually about the guard pivot axis 132 (i.e., in either the guard closing and opening directions 136, 138). For example, an operator may supply a force to the guard 108 that causes the guard 108 to pivot about the guard pivot axis 132. Alternatively, or in addition, a resiliently elastic member (e.g., torsion spring, not shown) may be positioned to assist pivoting the guard 108 about the guard pivot axis 132.

For example, the torsion spring may bias the guard 108 toward the guard closing direction 136 (i.e., when force is removed from the guard 108, the guard 108 pivots in the guard closing direction 136). To pivot the guard 108 in the guard opening direction 138, the operator may supply a force to the guard 108 sufficient to overcome the opposed spring bias. In alternative embodiments, the guard 108 cannot be manually pivoted about the guard pivot axis 132.

Figure 4:
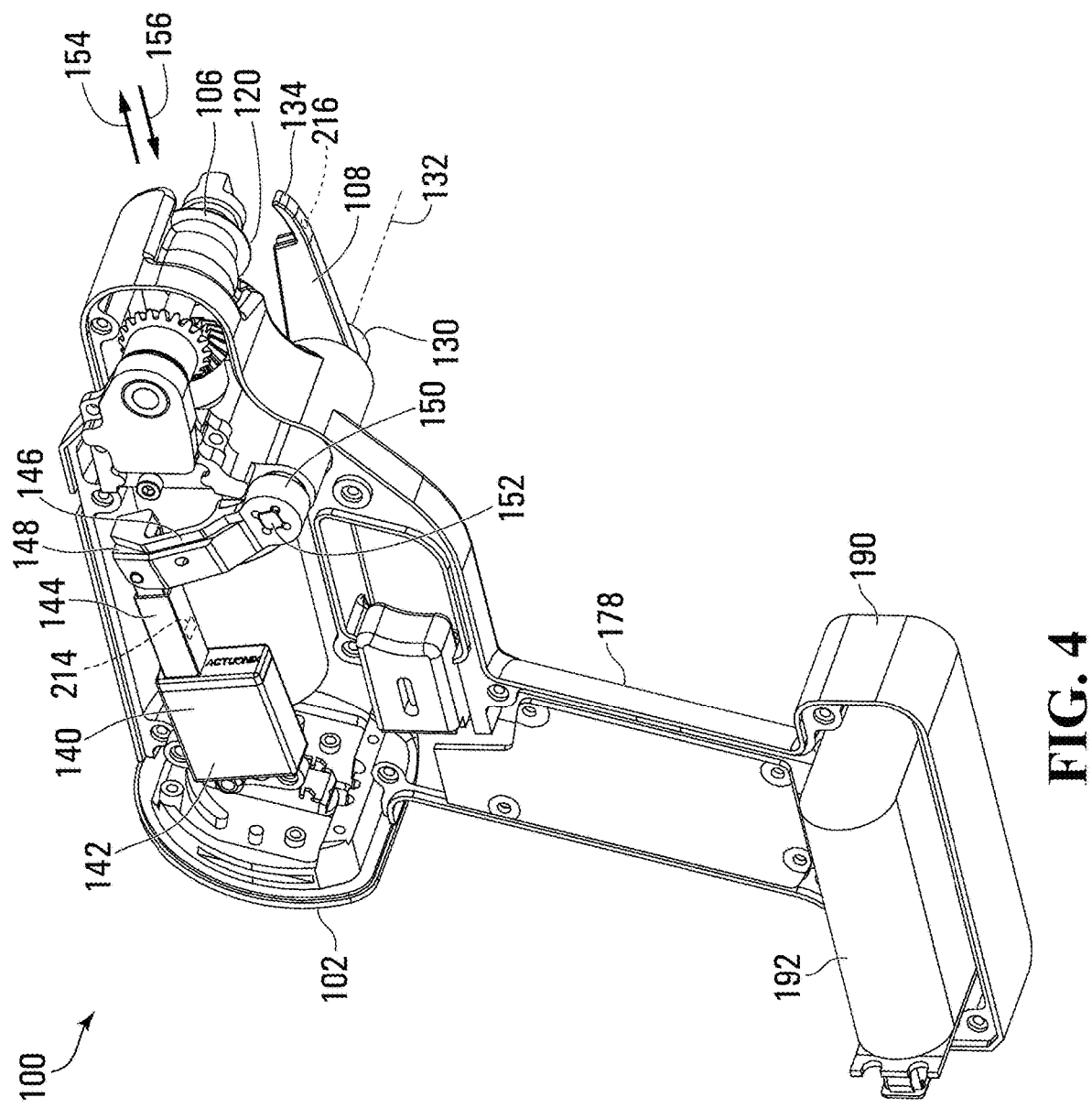
FIG. 4 is a side perspective view of the ring cutter of FIG. 2A, with a second half of its outer shell removed.

Referring to FIG. 4, the ring cutter 100 as illustrated includes a guard actuator 140 that is drivingly connected to the guard 108. The guard actuator 140 can control movement of the guard 108. As shown, the guard actuator 140 includes an actuator housing 142, an arm 144 movably connected to the actuator housing 142, and a linkage 146 having a link upper end 148 and an opposed link lower end 150. The link upper end 148 is pivotably connected to the arm 144 while the link lower end 150 is rigidly connected to a guard axle 152. The linkage 146 rotates in response to actuation of the arm 144, which in turn causes the guard axle 152 to rotate. The guard axle 152 is rigidly connected to the guard proximal end 130 so that rotation of the guard axle 152 causes the guard 108 to pivot about the guard pivot axis 132. In effect, actuation of the arm 144 causes the guard 108 to pivot about the guard pivot axis 132.

As the arm 144 moves outwardly of the actuator housing 142 (i.e., in an arm extending direction 154), the guard 108 is pivoted about the guard pivot axis 132 in the guard opening direction 138 (FIG. 2C). As described above, pivoting the guard 108 in the guard opening direction 138 causes the guard distal end 134 to move away from the peripheral cutting edge 120 of the blade 106. Conversely, as the arm 144 moves inwardly of the actuator housing 142 (i.e., in an arm retracting direction 156), the guard 108 is pivoted about the guard pivot axis 132 in the guard closing direction 136 (FIG. 2C). As described above, pivoting the guard 108 in the guard closing direction 136 causes the guard distal end 134 to move closer to the peripheral cutting edge 120 of the blade 106.

Any type of guard actuator that can pivot the guard 108 in the guard closing and opening directions 136, 138 may be used in the ring cutter 100. In the illustrated embodiment, the guard actuator 140 is a linear actuator (i.e., the arm 144 moves along a linear pathway). In an alternative embodiment, the guard actuator 140 may be a rotary actuator (e.g., motor). In this embodiment, the rotary actuator may be drivingly connected to the guard 108 directly, or indirectly (e.g., through the guard axle 152, by way of gear(s) and/or belt(s)).

The guard 108 may have any configuration that allows it to be inserted between a trapped ring and the appendage that ring is trapped on. For example, the guard 108 may be a straight or curved arm. The guard distal end 134 is preferably kept thin to facilitate inserting the guard 108 between the ring and the appendage from the guard distal end 134. The guard 108 can be made of any rigid material. Preferably, the guard 108 is made of a bio-compatible, high thermal capacity material (e.g., titanium, stainless steel, etc.) so that any heat generated during a cutting process is first dissipated into the guard 108. The extent to which the guard 108 can dissipate the heat generated during the cutting process reduces the heat generated that may be transferred to the appendage.

In the illustrated embodiment, the guard 108 includes a guard distal segment 158. The guard distal segment 158 has the guard distal end 134. As shown in FIGS. 2B and 2C, the guard distal segment 158 includes a ring abutment ledge 160 and a curved ring lever 162 that extends distally from the ring abutment ledge 160. The curved ring lever 162 is insertable between the ring and the appendage to position the ring against the ring abutment ledge 160. As shown in FIG. 6A, a portion of the guard distal segment 158 extends past the ring 10 when the ring 10 is positioned against the ring abutment ledge 160. The depressed shaped of the curved ring lever 162 may help keep the ring 10 in contact with the ring abutment ledge 160 during a cutting process, and thereby limit ring movement. Movement of the ring 10 during the cutting process can reduce cutting efficiency, as well as cause discomfort and/or injury to the patient.

Figure 3:
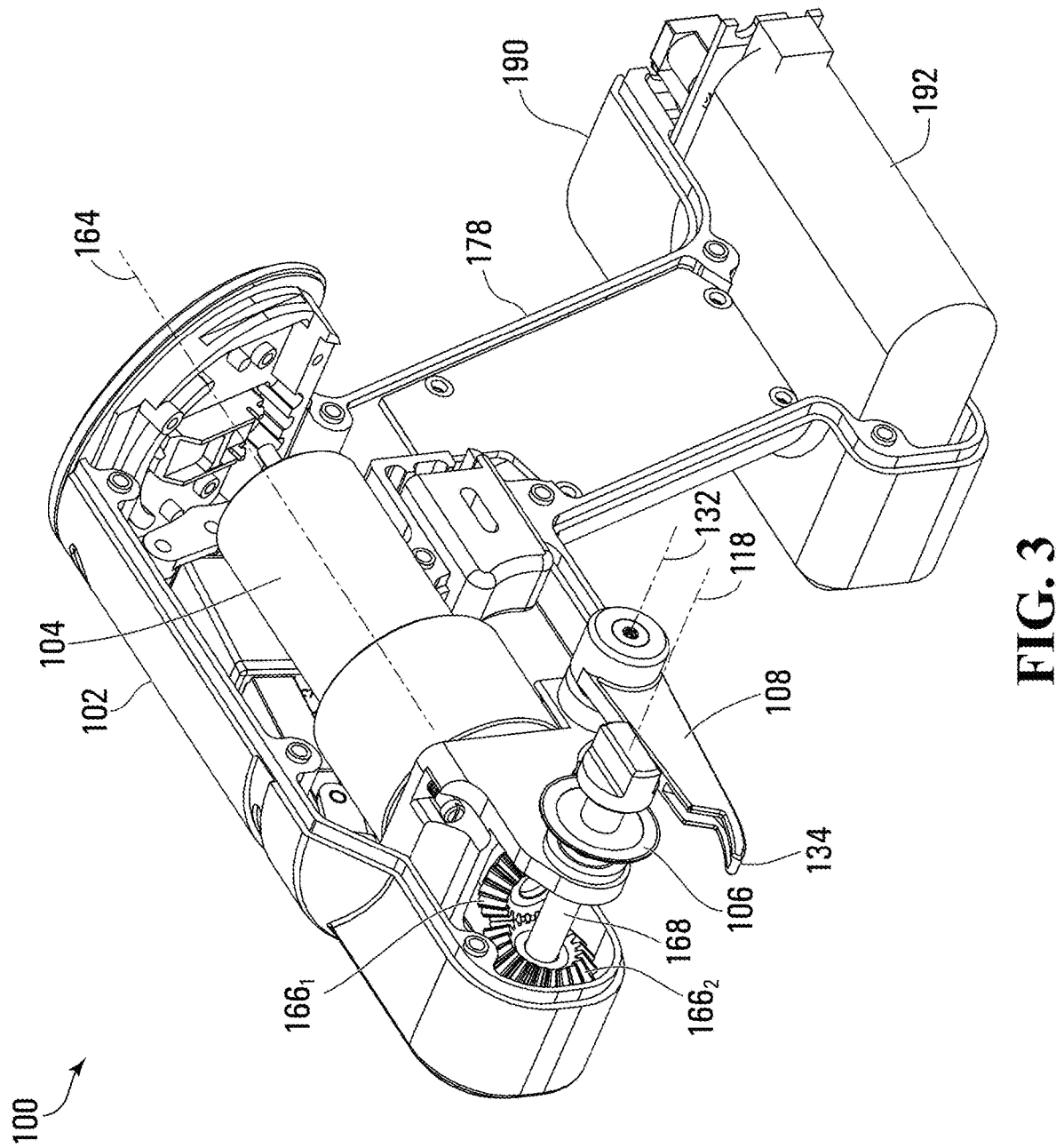
FIG. 3 is a front perspective view of the ring cutter of FIG. 2A, with a first half of its outer shell removed.

Referring to FIG. 3, the blade motor 104 has a motor rotation axis 164 that extends longitudinally (e.g., in a direction that intersects the front and rear ends 110, 112 of the ring cutter 100). In the illustrated embodiment, each of the blade rotation axis 118 and the guard pivot axis 132 extend laterally. Having the blade rotation axis 118 and the guard pivoting axis 132 extend laterally while the motor rotation axis 164 extends longitudinally can allow easier access to the ring being cut. Such a configuration is particularly advantageous in cases where the ring is stuck in a sensitive area (e.g., genitalia).

As exemplified in FIG. 3, the motor rotation axis 164 may extend transverse to the blade rotation axis 118. As used herein, "transverse" means within 45 degrees of perpendicular. To drivingly connect the blade motor 104 to the blade 106 with a blade rotation axis 118 that extends transverse to the motor rotation axis 164, one or more power transmission component(s) (e.g., worm gear, bevel gear, chain, belt, or the like) can be positioned between the blade motor 104 and the blade 106. In the illustrated embodiment, the blade rotation axis 118 extends perpendicularly to the motor rotation axis 164. This configuration can permit the operator to orient the ring cutter 100 so that the body 102 extends generally parallel to the appendage on which the ring is trapped. By aligning the body 102 with the appendage (e.g., finger or toe), obstruction caused by other nearby digits and/or body parts may be limited. As a result, the ring cutter 100 may be able to access and cut rings that are trapped in areas that would otherwise be difficult to access.

Referring still to FIG. 4, the blade motor 104 is drivingly connected to the blade 106 through intermeshed bevel gears $166_1$, $166_2$. The bevel gear $166_2$ is rigidly connected to a drive shaft 168 such that rotation of the bevel gear $166_2$ causes rotation of the drive shaft 168. Rotation of the blade motor 104 about the motor rotation axis 164 drives rotation of the bevel gear $166_1$ about the motor rotation axis 164, which in turn causes the bevel gear 1662 and the drive shaft 168 to rotate about the blade rotation axis 118. The drive shaft 168 is rigidly connected to the blade 108 such that rotation of the drive shaft 168 causes rotation of the blade 106. In effect, the bevel gears $166_1$, $166_2$ facilitate power transmission between the perpendicularly aligned rotation axes of the blade motor 104 and the blade 106.

Figure 5:
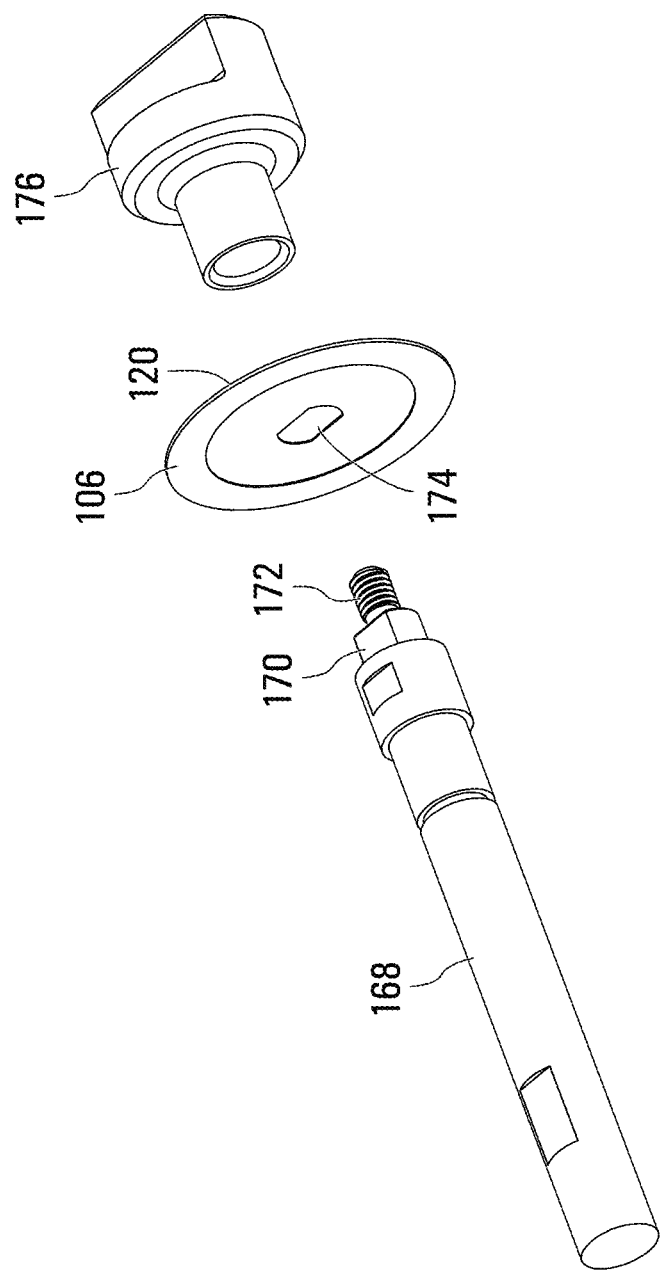
FIG. 5 is an exploded view of a drive shaft, a blade, and a blade coupler of the ring cutter of FIG. 2A.

As exemplified in FIG. 5, the blade 106 may be removably connected to the drive shaft 168. This can allow a used blade 106 to be replaced with a fresh blade 106 between uses. The blade 106 may be removably connected to the drive shaft 168 in a manner that provides a secure and releasable connection, e.g., mechanical fasteners. In the illustrated embodiment of FIG. 5, the drive shaft 168 includes a blade interface 170 and a threaded end portion 172 that extends distally from the blade interface 170. As shown, the blade 106 includes a central aperture 174 that corresponds with the blade interface 170 of the drive shaft 168. The corresponding mating shapes of the blade interface 170 and the central aperture 174 help ensure the blade 106 is axially aligned with the drive shaft 168 when installed (i.e., limits misalignments which may cause blade fractures).

To connect the blade 106 to the drive shaft 168, the threaded end portion 172 of the drive shaft is passed through the central aperture 174 of the blade 106 until the central aperture 174 mates with the blade interface 170. A blade retaining member 176 is then threadedly engaged with the threaded end portion 172 of the drive shaft 168 and tightened to provide a clamping force which sandwiches the blade 106 between the retaining member 176 and the drive shaft 168. To remove the blade 106 from the drive shaft 168, the above-described process can be performed in reverse.

Referring again to FIGS. 2A-2D, the ring cutter 100 can include a handle 178 for the operator to grasp during cutting operations. The handle 178 may have various positional arrangements and configurations, which improve the ergonomics of the ring cutter 100. As exemplified in FIGS. 2A-2D, the handle 178 may be provided at the lower end 116 of the ring cutter 100. As another example, the handle 178 may be located at the rear end 112 of the ring cutter 100 (e.g., see FIG. 8). As another yet example, the handle 178 may be located at the upper end 114 of the ring cutter 100. Optionally, the handle 178 may be removable from the body 102. The handle 178 can be removably mounted to the body 102 in any suitable fashion (e.g., dove-tail locking members, clips, etc.). In an alternative embodiment, the ring cutter 100 may not include a handle (e.g., see FIG. 9).

The handle 178 may have various configurations. For example, the handle 178 may be configured as a stick or linearly extending handle. In the illustrated embodiment shown in FIGS. 2A-2D, the handle 178 is configured as a pistol grip type handle. As shown, when the ring cutter 100 is oriented so that the upper end 114 is above the lower end 116, the pistol grip handle 178 extends upwardly and forwardly along a handle axis 180 (FIG. 2C) between handle upper and lower ends 182, 184. The handle upper end 182 is mounted to the body 102. When the ring cutter 100 is oriented with the upper end 114 positioned above the lower end 116, the body 102 has a body upper surface 186 and a body lower surface 188. As shown in FIG. 2C, the handle upper end 182 is mounted to the body lower surface 188.

As exemplified in FIGS. 2A-2D, a resting base 190 may be provided at the handle lower end 184. The resting base 190 may extend outboard of the handle lower end 184. The resting base 190 is engageable with a ring cutter support surface (e.g., a table, workbench, or other suitable support surface). Engaging the resting base 190 with a support surface can provide for one or more advantages during a cutting process. For example, the positioning of the resting base 190 on a support surface allows that support surface to bear at least a portion of the ring cutter's weight. This may reduce operator fatigue because the operator no longer must support the whole weight of the ring cutter 100 during the cutting process. Alternatively, or in addition, engagement of the resting base 190 with a support surface may enhance the stability of the ring cutter 100 during the cutting process (e.g., limit lateral movement of the guard 108). Lateral movement of the guard 108 relative to the ring and finger during the cutting process can cause bruising and discomfort to the patient.

The resting base 190 as illustrated extends outboard of the handle lower end 184 around the full handle perimeter. That is, the resting base 190 extends both forwardly and rearwardly of the handle lower end 184 (see FIG. 2C) and laterally outwardly from both sides of the handle lower end 184 (see FIG. 2D). This configuration may improve stability. In alternative embodiments, the resting base 190 may only extend forwardly and rearwardly of the handle lower end 184. In another alternative embodiment, the resting base 190 may only extend laterally from one side of the handle lower end 184. In alternative embodiments, the ring cutter 100 may not include a resting base.

Figure 7:
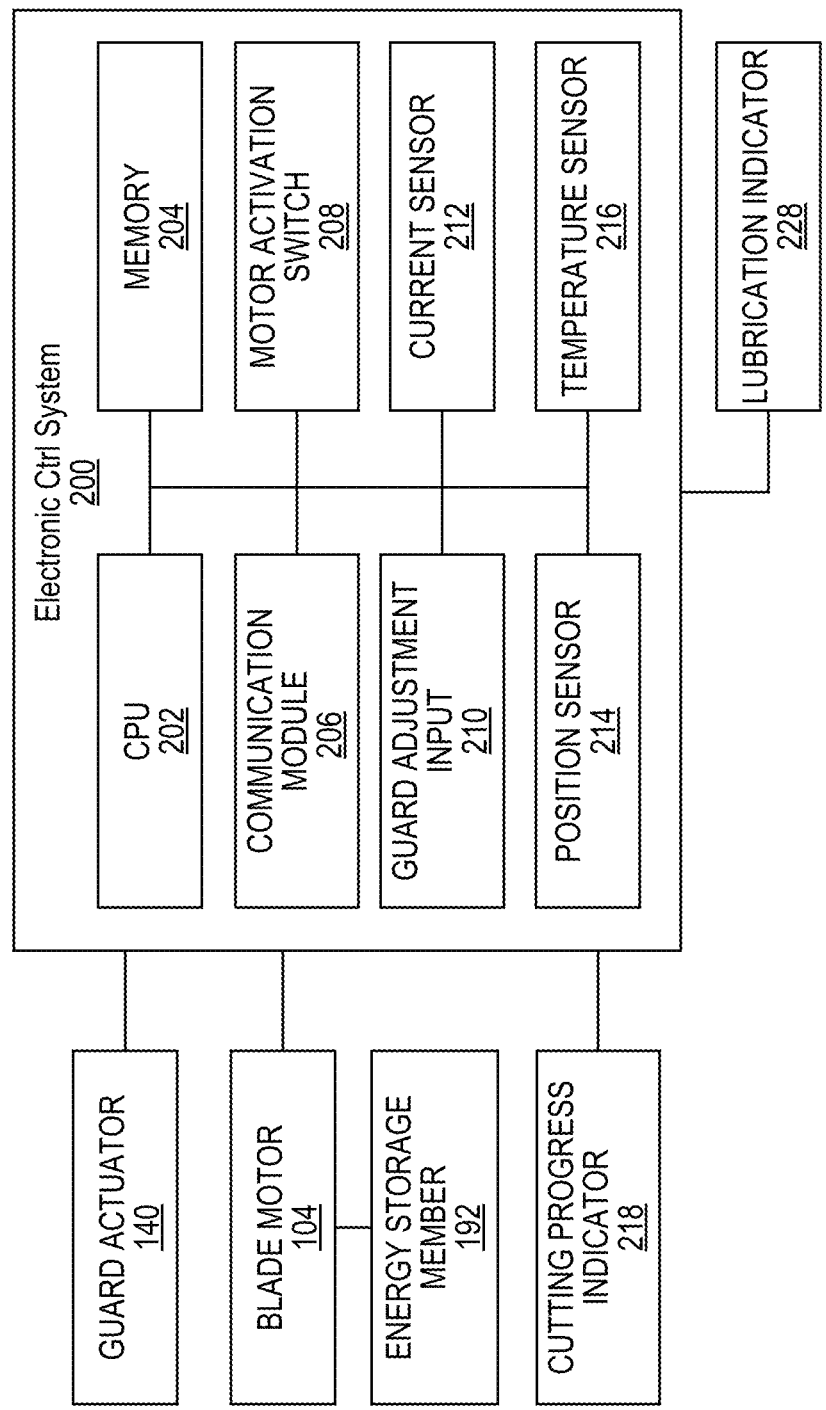
FIG. 7 is a schematic illustration of an electronic control system of the ring cutter of FIG. 2A.

Power may be supplied to the blade motor 104 and other electrical components of the ring cutter 100 from one or more energy storage members. In the illustrated embodiment, the ring cutter 100 includes an onboard energy storage member 192. The schematic of FIG. 7 illustrates the connection of the blade motor 104 and the energy storage member 192. The energy storage member 192 may include, for example, batteries, supercapacitors, or the like. The energy storage member 192 may be permanently mounted in the ring cutter 100 and rechargeable in-situ, and/or removable from the ring cutter 100 (e.g., the energy storage member 192 may be removably mounted to the ring cutter 100. The energy storage member 192 may be recharged in-situ by connecting one end of an electrical cord to a cord port 194 (FIGS. 2A and 2D) while the other end of the electrical cord is connected to mains power at a standard wall electrical outlet.

The onboard energy storage member 192 may have various positional arrangements, which may improve the ergonomics of the ring cutter 100 (e.g., reduced weight, better weight balance or greater portability). As an example, the energy storage member 192 may be housed in the body 102 and located rearwardly of the blade motor 104. As another example, the energy storage member 192 may be positioned within the handle 178. In the illustrated embodiment, the energy storage member 192 is provided at the handle lower end 184. As shown, the energy storage member 192 is housed in the resting base 190.

In alternative embodiments, the ring cutter 100 may not include an onboard energy storage member. For example, power may be supplied to the blade motor 104 and other electrical components of the ring cutter 100 by an electrical cord connected to the ring cutter 100. The electrical cord can be connected to mains power at a standard wall electrical outlet.

Figure 6B:
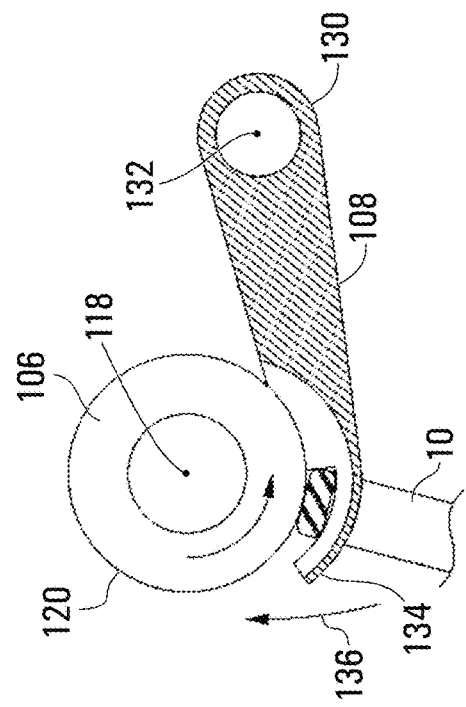
FIGS. 6A-6D are partial cross-sectional views of a ring positioned between a guard and cutting blade of the ring cutter of FIG. 2A, with the guard respectively shown in a guard insertion position, a start cutting position, a partially cut position, and a finished cutting position.
Figure 6D:
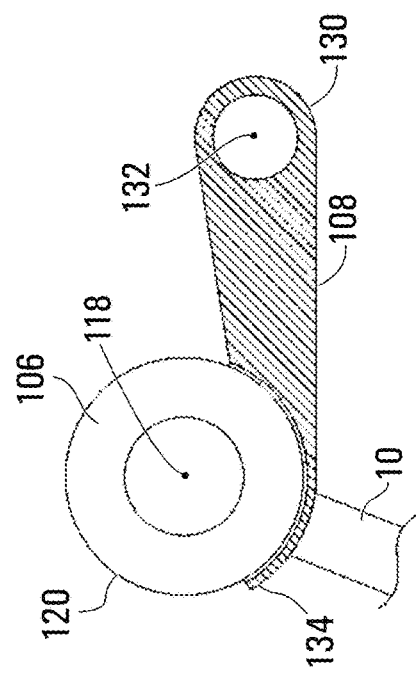
Figure 6A:
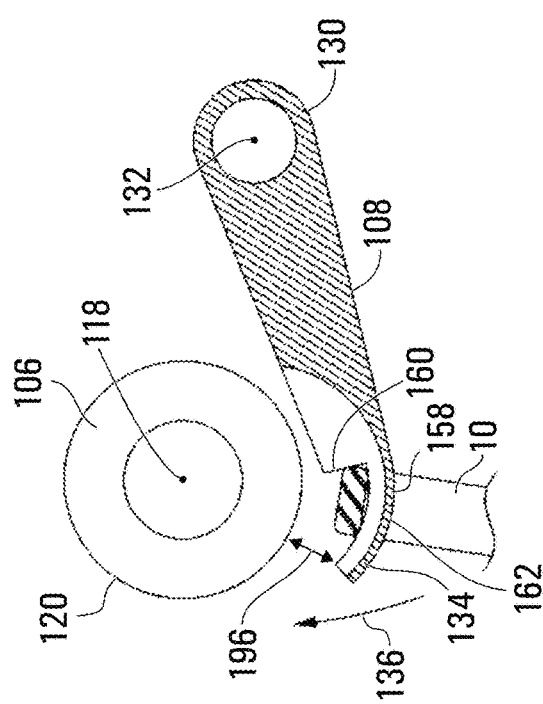

Reference is now made to FIGS. 6A-6D to illustrate an exemplary movement of the guard 108 throughout a ring cutting process. The guard actuator 140 (FIG. 4) may control pivoting of the guard 108 into the various positions described below. Alternatively, or in addition, an operator may manually pivot the guard 108 by supplying a force to the guard 108. As explained below, the guard 108 as illustrated is pivotable about the guard pivot axis 132 between a guard insertion position (FIG. 6A) and a cutting finished position (FIG. 6D). The guard 108 passes through a cutting start position (FIG. 6B) and a partially cut position (FIG. 6C) as it pivots from the guard insertion position to the cutting finished position.

FIG. 6A shows the guard 108 in the guard insertion position. In the guard insertion position, the guard 108 is pivoted about the guard pivot axis 132 to provide an insertion gap 196 between the peripheral cutting edge 120 of the blade 106 and the guard distal end 134. As exemplified, the insertion gap 196 is at least slightly larger than the cross-sectional thickness of the ring 10. Accordingly, when the guard 108 is in the guard insertion position, the insertion gap 196 may facilitate the insertion of the guard distal end 134 between the ring 10 and the peripheral cutting edge 120.

FIG. 6B shows the guard 108 in the cutting start position. In the cutting start position, the guard 108 is pivoted about the guard pivot axis 132 so that the ring 10 contacts the peripheral cutting edge 120 of the blade 106. In this position, the blade motor 104 can be activated to initiate rotation of the blade 106 about the blade rotation axis 118 (FIG. 2A). Comparing the cutting start position of FIG. 6B to the guard insertion position of FIG. 6A shows that the guard distal end 134 has moved closer to the peripheral cutting edge 120 of the blade 106 (i.e., due to pivoting of the guard 108 about the guard pivot axis 132 in the guard closing direction 136).

Figure 6C:
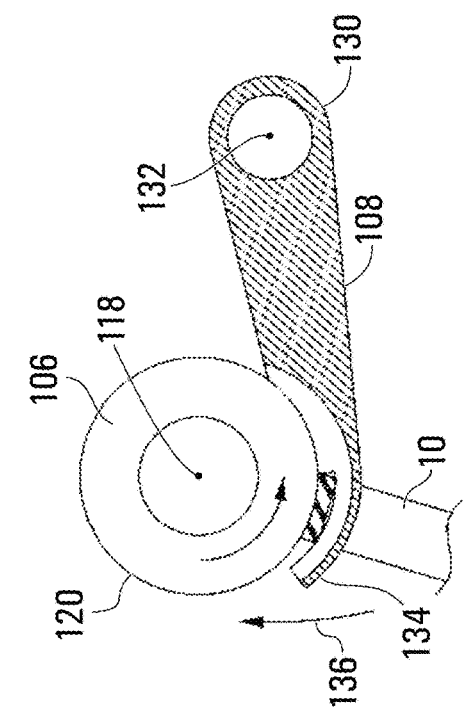

FIG. 6C shows the guard 108 in the partially cut position. As shown, the blade 106 has partially cut through the ring 10. Comparing the partially cut position of FIG. 6C to the cutting start position of FIG. 6B shows that the guard distal end 134 has moved even closer to the peripheral cutting edge 120 of the blade 106 (i.e., due to pivoting of the guard 108 about the guard pivot axis 132 in the guard closing direction 136).

FIG. 6D shows the guard in the cutting finished position. As shown, the blade 106 has completely transected (i.e., cut through) the ring 10. Once the ring 10 is transected, it can be spread apart and removed from the appendage. In some cases, a ring spreader may be used to simplify spreading apart the transected ring for removal. Comparing the cutting finished position of FIG. 6D to the partially cut position of FIG. 6C shows that the guard distal end 134 has moved even closer to the peripheral cutting edge 120 of the blade 106 (i.e., due to pivoting of the guard 108 about the guard pivot axis 132 in the guard closing direction 136).

As the guard 108 pivots from the cutting start position (FIG. 6B) to the cutting finished position (FIG. 6D), it supplies a force to the ring 10 that presses the ring 10 into the peripheral cutting edge 120 of the blade 106.

As described above, by virtue of its position between the appendage and the blade 106, the guard 108 can protect the appendage (e.g., finger or toe) from being cut by the blade 106. Preferably, the guard 108 is unable to contact the peripheral cutting edge 120 when the guard is in the cutting finished position. This can increase patient safety as the blade 106 may be physically unable to cut through the guard 108 and into the appendage.

In one embodiment, the guard 108 may be inhibited from pivoting toward the peripheral cutting edge 120 when in the cutting finished position. There are various ways the guard 108 may be inhibited from pivoting toward the peripheral cutting edge 120 when in the cutting finished position. For example, a pivot stop may be positioned to project into the pivot pathway of the guard 108 and obstruct the guard 108 from pivoting any farther in the guard closing direction 136. In the illustrated example, the guard actuator 140 bottoms out when the guard 108 is the cutting finished position (i.e., the arm 144 is fully retracted when the guard 108 is in the cutting finished position).

Reference is made to FIG. 7, which shows a schematic illustration of an example electronic control system 200 of the ring cutter 100. In the example shown, electronic control system 200 includes a processor 202, a memory 204, a communication module 206, a user-operable motor activation switch 208, a user operable guard adjustment input 210, a current sensor 212, a position sensor 214, and a temperature sensor 216. Each of the memory 204, the communication module 206, the motor activation switch 208, the guard adjustment input 210, the current sensor 212, the position sensor 214, and the temperature sensor 216 are communicatively coupled to the processor 202, directly or indirectly.

In some embodiments, the electronic control system 200 includes multiple of any one or more of the processor 202, the memory 204, the communication module 206, the motor activation switch 208, the guard adjustment input 210, the current sensor 212, the position sensor 214, and the temperature sensor 216. In some embodiments, electronic control system 200 does not include one or more of the memory 204, the communication module 206, the motor activation switch 208, the guard adjustment input 210, the current sensor 212, the position sensor 214, and the temperature sensor 216. For example, the electronic control system 200 may not include the memory 204, and/or may not include the communication module 206, and/or may not include the motor activation switch 208 and/or may not include the guard adjustment input 210, and/or may not include the current sensor 212, and/or may not include the position sensor 214, and/or may not include the temperature sensor 216.

In some embodiments, the electronic control system 200 is a single, unitary device that houses all of its subcomponents (the processor 202, the memory 204, etc.). In other embodiments, electronic control system 200 is composed of two or more discrete subdevices that are communicatively coupled to each other, that collectively include all of the subcomponents of electronic control system 200 (the processor 202, the memory 204, etc.), and that collectively provide the functionality described herein.

The schematic of FIG. 7 illustrates the connection of the electrical control system 200 to the blade motor 104, the guard actuator 140, a cutting progress indicator 218, and a lubrication indicator 228. Each of the blade motor 104, the guard actuator 140, the cutting progress indicator 218, and the lubrication indicator 228 may be connected to the electrical control system 200 through a wired connection (e.g., USB, JTAG, FTDI, etc.) or a wireless connection (e.g., wireless access network, Bluetooth®, etc.). These connections can allow the electronic control system 200 to communicate and/or relay signals with each of the blade motor 104, the guard actuator 140, the cutting progress indicator 218, and the lubrication indicator 228.

The memory 204 can include random access memory (RAM), read only memory (ROM), or similar types of memory. Also, in some embodiments, the memory 204 stores one or more applications for execution by the processor 202. Applications correspond with software modules including computer executable instructions to perform processing for the functions and methods described below. In some embodiments, some or all of the memory 204 may be integrated with the processor 202. For example, the processor 202 may be a microcontroller (e.g., Microchip™ AVR, Microchip™ PIC, or ARM™ microcontroller) with onboard volatile and/or non-volatile memory.

The processor 202 may have numerous I/O ports that may be communicatively coupled to one or more (or all) of the memory 204, the communication module 206, the motor activation switch 208, the guard adjustment input 210, the current sensor 212, the position sensor 214 and the temperature sensor 216, for example. The processor 202 may communicate with each subcomponent (e.g., the memory 204, the current sensor 212, etc.) by wire or wirelessly. Subcomponents may be communicatively coupled to the processor 202 by cables and/or PCB traces, for example.

Generally, the processor 202 can execute computer readable instructions (also referred to as applications or programs). The computer readable instructions can be stored in the memory 204. When executed, the computer readable instructions can configure the processor 202 (or multiple processors 202, collectively) to perform the acts described herein with reference to ring cutter 100, for example.

The communication module 206 can include any device capable of transmitting signals to and/or receiving signals from an external device. For example, the communication module 206 may include radios that communicate utilizing the CDMA, GSM, GPRS, NFC, or Bluetooth® protocol according to such standards as 802.11 a, 802.11 b, 802.11 g or 802.11n, for example. Alternatively, or in addition, the communication module 206 may include one or more USB ports for wired connections with external devices.

The current sensor 212 may be any device capable of measuring an electrical current associated with the blade motor 104. The current sensor 212 may communicate electrical current readings (by wire or wirelessly) to the processor 202, which may determine whether the current readings satisfy criteria associated with predetermined cutting parameters. Signals (i.e., information) from the current sensor 212 may be referred to as "current readings". The current sensor 212 may be positioned in any suitable location for sensing an electrical current associated with the blade motor 104. In one example, the current sensor 212 may be positioned upstream of the electrical current flowing into the blade motor 104. In this position, the current sensor 212 can sense the electrical current drawn by the blade motor 104. Alternatively, or in addition, the current sensor 212 may be positioned between the blade motor 104 and the energy storage member 192. In this position, the current sensor 212 can sense the electrical current passing from the energy storage member 192 to the blade motor 104.

The position sensor 214 may be any device capable of measuring a position associated with the guard 108. The position sensor 214 may include, for example one or more (or all) of a potentiometer (linear or rotary), a hall effect sensor, an accelerometer, a gyroscope, and a magnetometer. The position sensor 214 may communicate position readings (by wire or wirelessly) to the processor 202, which may determine whether the position readings require the cutting progress indicator 218 to be updated. Signals (i.e., information) from a position sensor 214 may be referred to as "position readings". The position sensor 214 may be positioned in any suitable location for sensing a position associated with the guard 108.

In the embodiment of FIG. 4, the position sensor 214 is shown on the arm 144 of the guard actuator 140. In this location, the position sensor 214 may sense a position of the guard actuator 140. For example, a linear potentiometer may be used to measure the absolute position of the arm 144. As described above with reference to FIG. 4, the position (i.e., actuation) of the arm 144 dictates the position of the guard 108. Upon receiving a position signal from the position sensor 214, the processor 202 may be configured to associate the position of the guard actuator 140 with a position of the guard 108. For example, the processor 202 may consult a lookup table of corresponding guard positions for each actuator position (i.e., each actuator step).

The temperature sensor 216 may be any device capable of measuring a temperature associated with the guard 108. The temperature sensor 216 may communicate temperature readings (by wire or wirelessly) to the processor 202, which may determine whether the temperature readings satisfy criteria associated with a safety protocol. Signals (i.e., information) from the temperature sensor 216 may be referred to as "temperature readings". The temperature sensor 216 may be positioned in any suitable location for sensing a temperature associated with the guard 108. For example, in FIG. 4, the temperature sensor 216 is shown positioned on the underside of the guard 108. In this position, the temperature sensor 216 can sense the temperature of the guard 108 where it contacts the appendage. It may be preferable to locate the temperature sensor 216 proximate the part of the guard 108 that contacts the ring during cutting because this is where the generated heat first dissipates.

FIG. 7 illustrates one example hardware schematic of an electronic control system 200 that may be used with the ring cutter 100. In alternative embodiments, electronic control system 200 contains fewer, additional, or different components. In addition, although aspects of an implementation of electronic control system 200 are described as being stored in memory, one skilled in the art will appreciate that these aspects can also be stored on or read from other types of computer program products or computer-readable media (e.g., a non-transitory computer-readable medium), such as secondary storage devices, including hard disks, floppy disks, CDs, or DVDs; a carrier wave from the Internet or other network; or other forms of RAM or ROM.

The ring cutter 100 may include a motor activation switch 208 that is provided to selectively control the operation of the blade motor 104 (e.g., either on/off or variable power levels or both), for example by establishing a power connection between energy storage member 192 and the blade motor 104. Motor activation switch 208 may be provided in any suitable location and include any input device that can be manually operated (i.e., operation by interaction with an operator's body part). For example, the motor activation switch 208 may include one or more tactile or capacitive buttons, rotary switches, sliding switches, trigger-type actuators, control knobs, or touchscreens. As an example, FIGS. 2A-2C show the motor activation switch 208 provided as a trigger-type actuator proximate the handle upper end 182. In this configuration, the trigger 208 can be actuated (i.e., squeezed) with the index or middle finger of the hand used to grip the handle 178.

The processor 202 is configured to activate and/or deactivate the blade motor 104 in response to user interaction with the motor activation switch 208. In some cases, the blade motor 104 may remain active (i.e., continue to run) until the user interaction is removed from the motor activation switch 208 (e.g., until the trigger is released). In other cases, the blade motor 104 may remain active between first and second user interactions with motor activation switch 208 (i.e., the first user interaction turns the blade motor 104 on and the second user interaction turns the blade motor 104 off).

As described above with reference to FIG. 6A, the guard 108 is pivotable about the guard pivot axis 132 to a guard insertion position. When the guard 108 is in the guard insertion position, the insertion gap 196 may facilitate the insertion of the guard distal end 134 between the ring 10 and the peripheral cutting edge 120 of the blade 106. The ring cutter 100 may include a guard adjustment input 210 to manually control movement of the guard 108 between the guard insertion position (e.g., FIG. 6A) and the cutting start position (e.g., FIG. 6B). The processor 202 may be configured to direct the guard actuator 140 to pivot the guard 108 about the guard pivot axis 132 between the guard insertion position and the cutting start position in response to user interaction with the guard adjustment input 210.

Figure 2D:
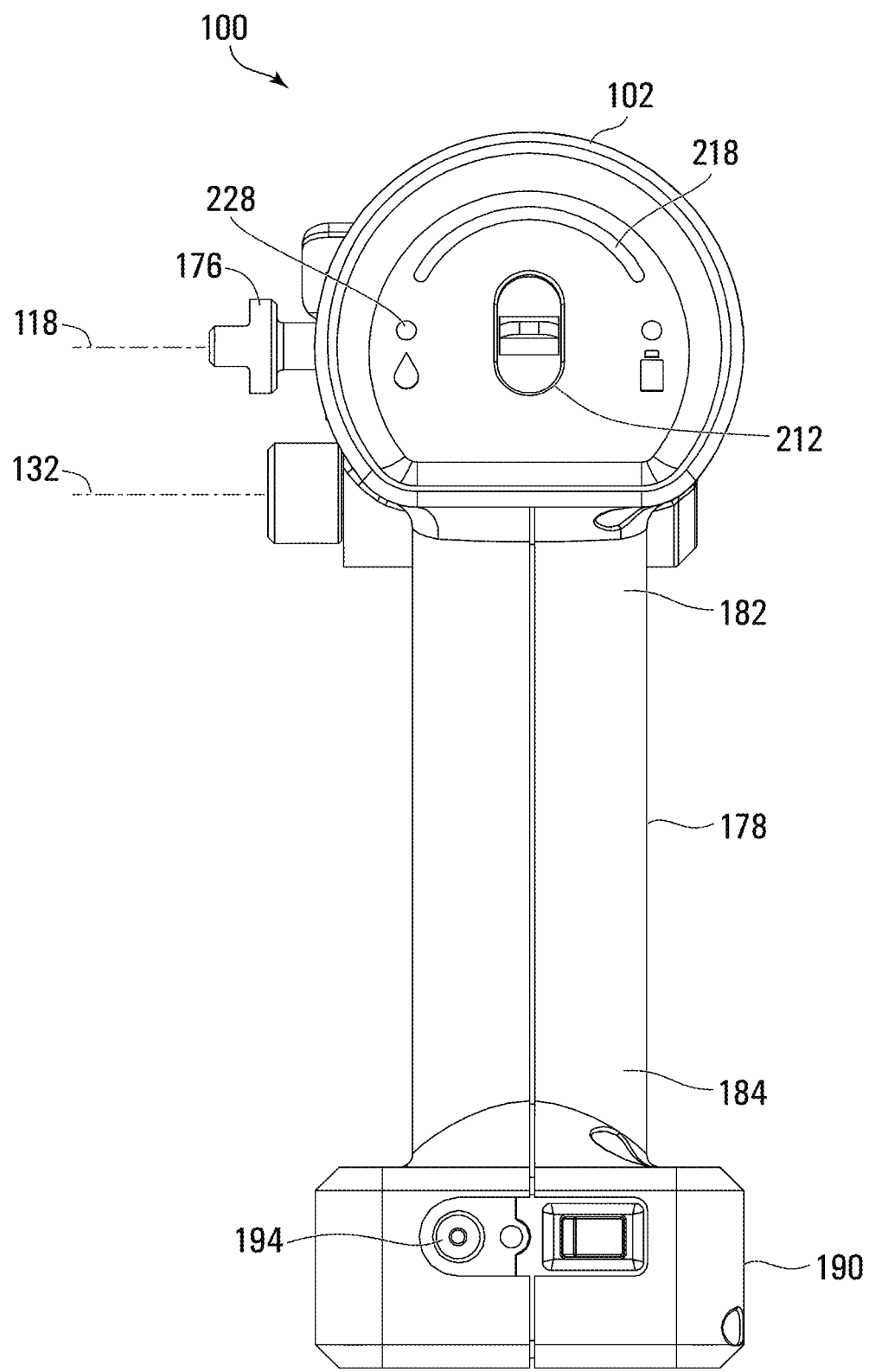

The guard adjustment input 210 may be provided in any suitable configuration and include any input device that can be manually operated (i.e., operation by interaction with an operator's body part). For example, the guard adjustment input 210 may include one or more tactile or capacitive buttons, switches, sliders, control knobs, or touchscreens. As an example, FIG. 2D shows the guard adjustment input 210 provided as a toggle switch on the rear end of the body 102. Pressing the toggle switch 210 up pivots the guard 108 in the guard closing direction 136. An operator may press the toggle switch 210 up to pivot the guard 108 from the guard insertion position (e.g., FIG. 6A) to the cutting start position (e.g., FIG. 6B). This may be done once the operator has inserted the guard 108 between the trapped ring and the appendage and is ready to begin cutting. Conversely, pressing the toggle switch 210 down pivots the guard 108 in the guard opening direction 138. In alternative embodiments, the directions of the toggle switch 210 may be reversed.

In some embodiments, the ring cutter 100 may include an electronic control system 200 (FIG. 7) that can automatically adjust the position of the guard 108 based on an electrical current reading associated with the blade motor 104.

The electrical current reading associated with the blade motor 104 can be used to approximate the torque applied to the blade 106 (also referred to herein as blade torque). The blade torque and the electrical current associated with the blade motor 104 are positively correlated. Accordingly, all else being equal, the electrical current associated with the blade motor 104 increases as the blade torque increases. This is because the electrical current drawn by the blade motor 104 increases as the blade torque increases (i.e., the blade motor 104 requires more current to operate at a higher load). Maintaining a stable blade torque during the cutting process can provide one or more advantages. For example, a stable blade torque can provide a consistent cutting performance across rings of various cross-sectional size and material. Alternatively, or in addition, maintaining a stable blade torque may help protect the user from excessive heat generation (e.g., that may be caused by excessive torque) and/or may help protect the blade motor 104 from overheating or burning out.

Referring still to FIG. 7, the processor 202 may be configured to receive, from the current sensor 212, an electrical current reading associated with the blade motor 104, and transmit, to the guard actuator 140, one or more commands to control the movement of the guard 108 based at least on the electrical current reading. For example, the processor 202 may transmit commands instructing the guard actuator 140 to move in response to current criteria. Current criteria may include that the electrical current reading (a) exceeds a threshold value, (b) falls below a threshold value, (c) lies outside a predetermined value range, (d) has increased faster than a threshold rate, (e) has decreased faster than a threshold rate, and/or (f) maintains a specific value for a predetermined amount of time or motor revolutions.

In one embodiment, the guard actuator 140 can control a movement speed of the guard 108 toward the peripheral cutting edge 120 of the blade 106 in response to commands from the processor 202 sent based on electrical current readings and current criteria. In this embodiment, the processor 202 may be configured to determine that the electrical current reading is low based on current criteria (e.g., falls below a threshold value, is below a predetermined value range, or has decreased faster than a threshold rate), and direct the guard actuator 140 to increase the movement speed of the guard 108 toward the peripheral cutting edge 120. Increasing the movement speed of the guard 108 towards the peripheral cutting edge 120 will increase the rate at which the ring is cut. This in turn can increase the blade torque and result in an increased current draw by the blade motor 104.

Alternatively, or in addition to increasing the movement speed based on low electrical current reading, the processor 202 may be configured to determine that the electrical current reading is high based on current criteria (e.g., exceeds a threshold value, is above a predetermined value range, or has increased faster than a threshold rate), and direct the guard actuator 140 to decrease the movement speed of the guard 108 toward the peripheral cutting edge 120. Decreasing the movement speed of the guard 108 towards the peripheral cutting edge 120 will decrease the rate at which the ring is cut. This in turn can decrease the blade torque and result in a decreased current draw by the blade motor 104.

Alternatively, or in addition, the processor 202 may be configured to determine that the electrical current reading is low and/or high based on current criteria, and control a pivoting of the guard 108 about the guard pivot axis 132 to move the guard 108 toward (if low) or away (if high) from the peripheral cutting edge 120 of the blade 106.

Alternatively, or in addition, the processor 202 may be configured to determine that the electrical current reading is low and/or high based on current criteria, and control a movement of the guard 108 to move the guard 108 toward (if low) or away (if high) from the cutting finished position.

The processor 202 may assess the electrical current reading against the current criteria in real time (e.g., at least once every second, such as 1-1,000,000 times per second) and direct the guard actuator 140 as indicated. The current criteria (e.g., predetermined upper and lower threshold values) may be stored in the memory 204. In some embodiments, the guard actuator 140 can control a movement of the guard 108 between at least the cutting start position and the cutting finished position, and processor 202 may assess the electrical current reading against the current criteria only when the guard 108 is positioned between the cutting start position and the cutting finished position. For example, the processor 202 may not automatically direct the position of guard 108 when the guard 108 is in a guard insertion position (e.g., opened farther than the cutting start position to facilitate insertion of the guard between the ring and appendage) (e.g., see FIG. 6A).

In some embodiments (and not others), the ring cutter 100 may include a cutting progress indicator 218. The cutting progress indicator 218 provides a visual indication to the operator and/or patient of how much ring remains to be cut. The cutting progress indicator 218 may provide any visual indication indicative of the remaining ring to cut. For example, the cutting progress indicator 218 may be implemented as an analog (e.g., a needle gage or sliding gage) or digital (e.g., light strip or LCD display) device. The remaining ring to be cut may be determined based on the position of guard 108 relative to its fully closed position (e.g., cutting finished position).

The cutting progress indicator 218 may receive the position of guard 108 in a mechanical or electrical manner. For example, an analog progress indicator may be mechanically connected to the guard 108 or to the guard actuator 140, and translate that position to a visual medium (e.g., a rotating needle or sliding indicator). In other examples, a digital progress indicator 218 may be directed by the processor 202, which receives electronic position information associated with the guard 108 from the position sensor 214. The processor 202 may be configured to receive, from the position sensor 214, a position signal associated with the guard 108, and direct the cutting progress indicator 218 to update based on the position signal.

In the illustrated embodiment, the cutting progress indicator 218 is digital and configured in the shape of an arc 218 (FIG. 2D). The degree to which arc 218 is colored or illuminated may convey to the operator or patient the amount of cutting that remains. When the arc is fully illuminated or colored (closed) the cut is complete (or it may be configured in reverse). In other embodiments, a digital cutting progress indicator 218 may be implemented as a string of discrete lights that are illuminated (or darkened) as the cutting progresses. In other embodiments, the cutting progress indicator 218 may be implemented using a series of discrete multi-coloured lights that change colour as the cutting progresses (e.g., green is the amount the ring that has been cut while blue is the amount of ring remaining to be cut).

The cutting progress indicator 218 may also provide a visual indication of the rate at which the ring is being cut and the remaining cut time. For example, if the cutting progress indicator 218 is static for a prolonged period, this would indicate to the operator that the ring cutting is not progressing.

The cutting progress indicator 218 may be positioned anywhere on the ring cutter 100. For example, the cutting progress indicator 218 may be located at the front end where it may be visible primary to the patient, on a side face where it may be visible to both the patient and operator, or a rear face (as shown in FIG. 2D) where it may be visible primarily to the operator. In the illustrated embodiment, the blade 106 is located at the front end 110 of the ring cutter 100 and the cutting progress indicator 218 is located at the rear end 112 of the ring cutter 100. Such an arrangement can make it easier for the operator to view the cutting progress indicator 218 during the cutting process and to react if the cutting is not progressing as expected.

In addition to or as an alternative to adjustments to the guard 108 based on motor current readings, the electronic control system 200 may adjust the speed of the blade motor 104 (and thereby the speed of blade 106) in response to temperature readings associated with the guard 108. The electronic control system 200 may store (e.g., in the memory 204) a threshold temperature that is safe for the patient. Above the threshold temperature, there is an increased risk of burning the appendage due to the heat generated by the cutting. By monitoring a temperature associated with the guard 108, the electronic control system 200 may set the blade motor 104 to the highest speed with a view to reducing the speed anytime the sensed temperature exceeds the predetermined temperature threshold. Compared to a system that does not monitor temperature, this avoids having to (a) rely on complaints of burning from the patient to determine that the speed should be decreased or (b) keep speeds relatively low to avoid any possibility of burning the patient. All things being equal, this should increase the cutting speed and reduce the time required to cut a trapped ring off an appendage.

In some embodiments, the processor 202 may be configured to receive, from the temperature sensor 216, a temperature reading associated with the guard 108, and direct a speed of the blade motor 104 based at least in part on the temperature reading. For example, the processor 202 may be configured to decrease the speed of the blade motor 104 in response to determining that the temperature reading exceeds a predetermined upper threshold value. Alternatively, or in addition, the processor 202 may be configured to decrease the speed of the blade motor 104 in response to determining that the change in temperature readings is trending towards a temperature that exceeds the predetermined upper threshold value. In some examples, the processor 202 may be configured to increase the speed of blade motor 104 in response to determining that the temperature reading (or change in temperature reading) is (or is trending towards) a value that falls below a predetermined lower threshold value.

Alternatively, or in addition to changing the speed of blade motor 104 based at least in part on temperature readings, the electronic control system 200 (e.g., the processor 202) may be configured to control the movement (e.g., movement speed) of the guard 108 based at least in part on the temperature reading. For example, the processor 202 may be configured to direct the guard actuator 140 to increase the movement speed of the guard 108 toward the peripheral cutting edge 120 in response to determining that the temperature reading is below a predetermined lower threshold value. Alternatively, or in addition, the processor 202 may be configured to direct the guard actuator 140 to decrease the movement speed of the guard 108 toward the peripheral cutting edge 120 in response to determining that the temperature reading exceeds a predetermined upper threshold value.

The processor 202 may assess the temperature readings against the temperature criteria (e.g., value exceeds or falls below an upper or lower threshold value, or rate of change in value is trending towards a value above or below an upper or lower threshold value) in real time (e.g., at least once every second, such as 1-1,000,000 times per second) and direct the blade motor 104 and/or the guard actuator 140 as indicated. The temperature criteria (e.g., the predetermined upper and lower threshold values) may be stored in the memory 204.

In some embodiments (and not others), the ring cutter 100 may include a lubrication indicator 228. The lubrication indicator 228 can provide a visual and/or audible alert or reminder to the operator to apply a lubricant. The application of a lubricant (or coolant) during the cutting operation may reduce cut time, cutting temperature, or both. Lubricant can be applied on the inside face of the blade 106, the outside face of the blade 106, the ring, or a combination thereof. Lubricant can be applied with an external dispensing vessel. Alternatively, the ring cutter 100 may have an onboard lubrication reservoir (not shown) for holding and dispensing lubricant or coolant.

The lubrication indicator 228 may provide any visual or audible alert to the operator that lubricant or coolant should be applied. For example, the lubrication indicator 218 may be implemented as a speaker that emits an audible sound to notify the operator that lubricant should be added (e.g., a "beeping" noise). Alternatively, the lubrication indicator 228 may be a light strip or an LCD display. In the illustrated embodiment, the lubrication indicator 228 is digital and implemented as an LED 228 (see FIG. 2D). In this embodiment, the LED 228 may flash when lubricant or coolant should be applied. Alternatively, the LED 228 may change colours when lubricant or coolant should be applied.

The lubrication indicator 228 may be directed by the processor 202, which may be configured to track cutting time. For example, the processor 202 may track cutting time starting from the activation of the blade motor 204. The processor 202 may direct the lubrication indicator 228 to issue an alert at a regular interval throughout the cutting process (e.g., beep every 3 minutes, start flashing every 4 minutes, etc.).

Alternatively, or in addition, the processor 202 may direct the lubrication indicator 228 based on cutting progress (e.g., apply lubricant at 25, 50% and 75% completion). As described above, to determine cutting progress, the processor 202 may receive electronic position information associated with the guard 108 from the position sensor 214. The processor 202 may be configured to receive, from the position sensor 214, a position signal associated with the guard 108, and direct the lubrication indicator 228 to operate based on the position signal.

Alternatively, or in addition, the processor 202 may direct the lubrication indicator 228 based on guard temperature. As described above, the processor 202 may receive temperature readings associated with the guard 108 from the temperature sensor 216. The processor 202 may be configured to receive, from the temperature sensor 214, a temperature signal associated with the guard 108, and direct the lubrication indicator 228 to operate (e.g., beep if a speaker, flash if a light) based on the temperature signal. For example, the processor 202 may be configured to direct the lubrication indicator 228 to operate in response to determining that the temperature reading is above a predetermined upper threshold value. The application of lubricant or coolant may lower the temperature.

The lubrication indicator 228 may be positioned anywhere on the ring cutter 100. For example, the lubrication indicator 228 may be located on a side face where it may be visible to both the patient and operator, or a rear face (as shown in FIG. 2D) where it may be visible primarily to the operator. In the illustrated embodiment, the blade 106 is located at the front end 110 of the ring cutter 100 and the lubrication indicator 218 is located at the rear end 112 of the ring cutter 100. Such an arrangement can make it easier for the operator to view or hear the lubrication indicator 218 during the cutting process.

FIG. 8 shows a ring cutter, referred to generally as 100', in accordance with an alternative embodiment. The ring cutter 100' shown in FIG. 8 is similar to the ring cutter 100 of FIGS. 2A-2D. Elements having similar structure and/or performing similar function as those in the ring cutter 100 of FIGS. 2A-2D are similarly numbered. Differences between the ring cutter 100' and the ring cutter 100 are described below.

Referring to FIG. 8, the body 102 extends from a body nose end 220 to a body rear end 222 along a body axis 224. As shown, the body 102 tapers from the body rear end 222 toward the body nose end 220. The blade 106 is positioned proximate the body nose end 220. This configuration keeps the ring cutter 100' compact in the region surrounding the blade 106 and may provide it easier access to rings in tight spaces.

The handle 178 is located at the rear end 112 of the ring cutter 100'. The handle upper end 182 is mounted to the body rear end 222. As shown, the handle 178 extends downwardly and rearwardly from the handle upper end 182 at an angle of about 40° relative to the body axis 224. In alternative embodiments, the angle may be higher (e.g., between 40 and 60°) or less (e.g., between 20 and 40°). Orienting the handle 178 so that the handle axis 180 extends at an angle between 20 and 60° relative to the body axis 224 may improve the ergonomics of the ring cutter 100'.

FIG. 9 shows a ring cutter, referred to generally as 100", in accordance with another alternative embodiment. The ring cutter 100" shown in FIG. 9 is similar to the ring cutter 100 of FIGS. 2A-2D. Elements having similar structure and/or performing similar function as those in the ring cutter 100 of FIGS. 2A-2D are similarly numbered. Differences between the ring cutter 100" and the ring cutter 100 are described below.

Referring to FIG. 9, the body 102 is configured as a block that is designed to sit on a support surface 226 (e.g., a workbench, counter, etc.). Accordingly, the support surface 226 may bear the full weight of the ring cutter 100". In some cases, the ring cutter 100" may be operated by the individual who has the ring trapped on one of their appendages. That is, there may be no need of a second individual to operator the ring cutter 100". This may be convenient in an emergency when no one else is available to operate the ring cutter 100".

As described above, lateral movement of the guard 108 relative to the ring 10 and the finger 20 during a cutting process can cause bruising and discomfort to the patient. The block configuration of the body 102 may provide the ring cutter 100" with enhanced stability (e.g., due to the extent of its surface-to-surface contact with the support surface 226). In some cases, the body 102 may be weighted to avoid it from moving relative to the support surface 226 (e.g., slipping) during the cutting process. The ring cutter 100" has no need for a handle, although one may be provided in alternative embodiments to make it easier to adjust the position of the ring cutter 100".

FIG. 10 shows a schematic illustration of a kit 400. As shown, the kit 400 includes the ring cutter 100 of FIGS. 2A-2D and a compression device 402 for freeing a ring trapped on an appendage. In an alternative embodiment, the ring cutter 100 in kit 400 may be replaced with the ring cutter 100' of FIG. 8 or the ring cutter 100" of FIG. 9. The compression device 402 may be any one of the compression devices disclosed in U.S. Pat. No. 10,702,282, which is incorporated herein by reference in its entirety, except for any definitions, subject matter disclaimers or disavowals, and except to the extent that the incorporated material is inconsistent with the express disclosure herein, in which case the language in this disclosure controls.

The compression device 402 is designed to non-destructively remove a trapped ring from an appendage. That is, the compression device 402 can be used to remove the ring from the appendage without causing any permanent damage, change and/or transformation to the ring. On the other hand, the ring cutter 100 is designed to transect a ring trapped on an appendage. In this way, the kit 400 provides both a non-destructive means (i.e., the compression device 402) and a destructive method means (e.g., the ring cutter 100) to remove rings trapped on appendages. With the kit 400, the operator may first elect to use the compression device 402 to free a trapped ring without damaging it. If this proves unsuccessful, the operator may then use the ring cutter 100 to transect the trapped ring (i.e., cut it off).

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole. Items Item 1. A ring cutter for safely transecting a ring trapped on an appendage, the ring cutter comprising:
- a body;
- a blade motor housed in the body;
- a circular blade drivingly connected to the blade motor, the blade having a blade rotation axis and a peripheral cutting edge;
- a guard coupled to the body and insertable between the ring and the appendage to position the ring between the guard and the blade;
- a guard actuator drivingly connected to the guard and controlling a movement of the guard;
- a current sensor positioned to sense electrical current associated with the blade motor; and
- one or more processors communicatively coupled to the current sensor and the guard actuator, wherein the one or more processors are configured to collectively:
  - receive, from the current sensor, an electrical current reading associated with the blade motor; and
  - transmit, to the guard actuator, one or more commands to control the movement of the guard based at least on the electrical current reading.

Item 2. A ring cutter for safely transecting a ring trapped on an appendage, the ring cutter comprising:
- a body;
- a blade motor housed in the body;
- a circular blade drivingly connected to the blade motor, the blade having a blade rotation axis and a peripheral cutting edge;
- a guard coupled to the body and insertable between the ring and the appendage to position the ring between the guard and the blade;
- a guard actuator drivingly connected to the guard and controlling a movement of the guard between at least a cutting start position and a cutting finished position;
- a position sensor located to sense a position associated with the guard;
- a cutting progress indicator associated with the movement of the guard between the cutting start and cutting finished positions; and
- one or more processors communicatively coupled to the position sensor and the cutting progress indicator, wherein the one or more processors are configured to collectively:
  - receive, from the position sensor, a position signal associated with the guard; and
  - direct the cutting progress indicator to update based on the position signal.

Item 3. A ring cutter for safely transecting a ring trapped on an appendage, the ring cutter comprising:
- a body;
- a blade motor housed in the body;
- a circular blade drivingly connected to the blade motor, the blade having a blade rotation axis and a peripheral cutting edge;
- a guard coupled to the body and insertable between the ring and the appendage to position the ring between the guard and the blade;
- a temperature sensor positioned to sense a temperature associated with the guard; and
- one or more processors communicatively coupled to the temperature sensor and the blade motor, wherein the one or more processors are configured to collectively:
  - receive, from the temperature sensor, a temperature reading associated with the guard; and
  - direct a speed of the blade motor based at least in part on the temperature reading.

Item 4. A ring cutter for safely transecting a ring trapped on an appendage, the ring cutter comprising:
- a body;
- a blade motor housed in the body;
- a circular blade drivingly connected to the blade motor, the blade having a blade rotation axis and a peripheral cutting edge;
- a guard coupled to the body and insertable between the ring and the appendage to position the ring between the guard and the blade;
- a guard actuator drivingly connected to the guard and controlling a movement of the guard;
- a temperature sensor positioned to sense a temperature associated with the guard; and
- one or more processors communicatively coupled to the temperature sensor and the guard actuator, wherein the one or more processors are configured to collectively:
  - receive, from the temperature sensor, a temperature reading associated with the guard; and
  - transmit, to the guard actuator, one or more commands to control the movement of the guard based at least in part on the temperature reading.

Item 5. The ring cutter of any preceding item, wherein said controlling the movement of the guard comprises controlling a movement speed of the guard toward the peripheral cutting edge, and the one or more processors are further configured to collectively:
- in response to determining that the electrical current reading is below a predetermined lower threshold value, direct the guard actuator to increase the movement speed of the guard toward the peripheral cutting edge.

Item 6. The ring cutter of any preceding item, wherein the one or more processors are further configured to collectively:
- in response to determining that the electrical current reading exceeds a predetermined upper threshold value, direct the guard actuator to decrease the movement speed of the guard toward the peripheral cutting edge.

Item 7. The ring cutter of any preceding item, wherein the guard has a guard proximal end pivotably connected to the body at a guard pivot axis, and a guard distal end spaced apart from the guard proximal end, the guard distal end being insertable between the ring and the appendage to position the ring between the guard and the blade.

Item 8. The ring cutter of any preceding item, wherein the blade motor has a motor rotation axis that extends longitudinally, and the guard pivot axis extends laterally.

Item 9. The ring cutter of any preceding item, wherein said controlling the movement of the guard comprises controlling a pivoting of the guard about the guard pivot axis.

Item 10. The ring cutter of any preceding item, wherein the guard is pivotable about the guard pivot axis in:
- a guard closing direction, which moves the guard distal end toward the peripheral cutting edge, and
- a guard opening direction, which moves the guard distal end away from the peripheral cutting edge.

Item 11. The ring cutter of any preceding item, wherein the one or more processors are further configured to collectively:
- in response to determining that the electrical current reading is below a predetermined lower threshold value, direct the guard actuator to pivot the guard about the guard pivot axis in the guard closing direction.

Item 12. The ring cutter of any preceding item, wherein the guard is pivotable about the guard pivot axis between at least:

a cutting start position; and
a cutting finished position, in which the guard distal end is closer to the peripheral cutting edge than in the cutting start position.

Item 13. The ring cutter of any preceding item, wherein the one or more processors are further configured to collectively:
in response to determining that the electrical current reading is below a predetermined lower threshold value, direct the guard actuator to pivot the guard about the guard pivot axis toward the cutting finished position.

Item 14. The ring cutter of any preceding item, wherein the guard is inhibited from pivoting toward the peripheral cutting edge when in the cutting finished position.

Item 15. The ring cutter of any preceding item, wherein the guard is pivotable about the guard pivot axis to a guard insertion position, in which the guard distal end is spaced farther apart from the peripheral cutting edge than in the cutting start position.

Item 16. The ring cutter of any preceding item, wherein the cutting start position is intermediate of the cutting finished position and the guard insertion position.

Item 17. The ring cutter of any preceding item, further comprising a user-operable guard adjustment input communicatively coupled to at least one of the processors, and the one or more processors are further configured to collectively:
direct the guard actuator to pivot the guard about the guard pivot axis between the guard insertion position and the cutting start position in response to user interaction with the guard adjustment input.

Item 18. The ring cutter of any preceding item, wherein the one or more processors are configured to collectively:
perform said receiving and transmitting when the guard is between the cutting start position and the cutting finished position.

Item 19. The ring cutter of any preceding item, further comprising an energy storage member electrically coupled to the blade motor to power the blade motor.

Item 20. The ring cutter of any preceding item, further comprising a pistol grip handle provided at a rear end of the ring cutter.

Item 21. The ring cutter of any preceding item, wherein the pistol grip handle has an upper end that is mounted to the body.

Item 22. The ring cutter of any preceding item, wherein, when the ring cutter is oriented with an upper end of the ring cutter positioned above a lower end of the ring cutter, the body has a body upper surface and a body lower surface, and the upper end of the pistol grip handle is mounted to the body lower surface.

Item 23. The ring cutter of any preceding item, further comprising a resting base provided at a lower end of the pistol grip handle, the support base extending outboard of the lower end of the pistol grip handle, the resting base being engageable with a ring cutter support surface.

Item 24. The ring cutter of any preceding item, further comprising an energy storage member electrically coupled to the blade motor to power the blade motor, the energy storage member being positioned at a lower end of the pistol grip handle.

Item 25. The ring cutter of any preceding item, wherein the energy storage member is housed in the resting base.

Item 26. The ring cutter of any preceding item, further comprising a user-operable motor activation switch communicatively coupled to at least one of the processors, and the one or more processors are further configured to collectively:
activate the blade motor in response to user interaction with the motor activation switch.

Item 27. The ring cutter of any preceding item, wherein the motor activation switch is provided proximate the upper end of the pistol grip handle.

Item 28. The ring cutter of any preceding item, wherein the blade motor has a motor rotation axis that extends transverse to the blade rotation axis.

Item 29. The ring cutter of any preceding item, wherein the blade motor has a motor rotation axis that extends longitudinally, and the blade rotation axis extends laterally.

Item 30. The ring cutter of any preceding item, wherein the guard includes a guard distal segment that has the guard distal end, and the guard distal segment including a ring abutment ledge and a curved ring lever extending distally from the ring abutment ledge, the curved ring lever being insertable between the ring and the appendage to position the ring against the ring abutment ledge.

Item 31. The ring cutter of any preceding item, wherein the blade is removably connected to a drive shaft of the blade motor.

Item 32. The ring cutter of any preceding item, wherein the position sensor is located to sense a position of the guard actuator, and the one or more processors are further configured to collectively:
associate the position of the guard actuator with a position of the guard.

Item 33. The ring cutter of any preceding item, wherein the guard actuator is a linear actuator, and the position sensor is a linear sensor.

Item 34. The ring cutter of any preceding item, wherein the guard actuator is a rotary actuator, and the position sensor is a rotation sensor.

Item 35. The ring cutter of any preceding item, wherein the blade is located at a front end of the ring cutter and the cutting progress indicator is located at a rear end of the ring cutter.

Item 36. The ring cutter of any preceding item, wherein the one or more processors are further configured to collectively:
decrease the speed of the blade motor in response to determining that the temperature reading exceeds an upper threshold value.

Item 37. The ring cutter of any preceding item, wherein the temperature sensor is positioned on the guard.

Item 38. The ring cutter of any preceding item, wherein said controlling the movement of the guard comprises controlling a movement speed of the guard toward the peripheral cutting edge, and the one or more processors are further configured to collectively:
in response to determining that the temperature reading is below a predetermined lower threshold value, direct the guard actuator to increase the movement speed of the guard toward the peripheral cutting edge.

Item 39. The ring cutter of any preceding item, wherein the one or more processors are further configured to collectively:
in response to determining that the temperature reading exceeds a predetermined upper threshold value, direct the guard actuator to decrease the movement speed of the guard toward the peripheral cutting edge.

Item 40. A kit comprising:
the ring cutter of any preceding item, and a compression device for freeing the ring trapped on the appendage, the compression device comprising:
an outer body extending from a body proximal end to a body distal end, the outer body comprising:
a digit cavity extending from a cavity proximal opening at the body proximal end, and
a fluid inlet; and
a removable bladder including a bladder intermediate portion joining a bladder proximal portion to a bladder distal portion, the bladder intermediate portion located inside the digit cavity,
wherein the removable bladder and the outer body together define an inflation chamber inside the digit cavity, and the fluid inlet is fluidly connected to the inflation chamber.

The invention claimed is:

1. A method of medical treatment for transecting a ring trapped on an appendage of a patient, the method of medical treatment comprising:
grasping a pistol grip handle of a handheld ring cutter with an operator's hand, wherein the handheld ring cutter comprises:
a body extending in a longitudinal direction from a body front end proximate the patient to a body rear end proximate the operator;
a blade motor housed in the body, the blade motor having a motor rotation axis extending in the longitudinal direction;
a circular blade drivingly connected to the blade motor via a drive shaft, the drive shaft defining a blade rotation axis extending in a lateral direction,
the lateral direction being horizontal and transverse to the longitudinal direction,
the drive shaft protruding in the lateral direction out of the body, and the circular blade being mounted to the drive shaft outside of the body at a position spaced from the body in the lateral direction;
a safety guard pivotably connected to the body to rotate about a guard rotation axis, the guard rotation axis extending in the lateral direction, the safety guard being located outside of the body at a position spaced from the body in the lateral direction, and the safety guard being aligned with the circular blade,
the safety guard being rotatable about the guard rotation axis toward the circular blade, and the safety guard being mechanically inhibited from rotating about the guard rotation axis into contact with the circular blade;
an electro-mechanical guard actuator drivingly connected to the safety guard and controlling movement of the guard;
the pistol grip handle extending upwardly from a handle lower end to a handle upper end, the handle upper end being connected to the body;
a motor activation trigger connected to the pistol grip handle proximate the handle upper end;
a resting base connected to the handle lower end and positioned below the handle, the resting base extending outwardly of the handle lower end;
an energy storage member positioned within the resting base and electrically connected to the blade motor;
a guard position sensor located to sense a rotational position of the safety guard about the guard rotation axis;
a cutting progress indicator associated with the rotational position of the safety guard about the guard rotation axis, the cutting progress indicator positioned at the body rear end facing the operator;
one or more processors communicatively coupled to the position sensor and the cutting progress indicator,
inserting the safety guard between the appendage and a portion of the ring;
grounding the resting base stationary on a horizontal surface thereby supporting at least a portion of a weight of the blade motor on the horizontal surface;
while performing said grounding, squeezing the motor activation trigger with a finger of the operator's hand that is grasping the pistol grip handle thereby powering the blade motor with the energy storage member to rotate the circular blade about the blade rotation axis, the portion of ring being located between the safety guard and the circular blade; and
while performing said grounding and said squeezing, transecting the portion of the ring, said transecting including the one or more processors collectively:
directing the safety guard actuator to move the safety guard toward the circular blade thereby urging the ring into contact with the rotating circular blade,
periodically receiving position signals from the guard position sensor, and
periodically directing the cutting progress indicator to update based on the position signals.

2. The method of medical treatment of claim 1, wherein the circular blade has a diameter of between 10 mm and 50 mm.

3. The method of medical treatment of claim 1, wherein:
the handheld ring cutter further comprises a current sensor positioned to sense electrical current associated with the blade motor;
the circular blade is located at a higher elevation than the portion of the ring, and
said directing the safety guard actuator to move the safety guard comprises the one or more processors collectively:
receiving, from the current sensor, an electrical current reading associated with the blade motor; and
directing the safety guard actuator to move the safety guard, based at least in part on the electrical current reading, upwardly toward the circular blade thereby urging the ring into contact with the rotating circular blade.

4. The method of medical treatment of claim 1,
wherein during said transecting, the portion of the ring is located outboard of the pistol grip handle in the lateral direction.

5. The method of medical treatment of claim 1, wherein during said transecting, the portion of the ring is located outboard of the blade motor in the lateral direction and the blade motor is inline with the pistol grip handle in the longitudinal direction.

6. The method of medical treatment of claim 1, wherein:
the handheld ring cutter further comprises a current sensor positioned to sense electrical current associated with the blade motor; and
said transecting comprises the one or more processors collectively:
receiving, from the current sensor, an electrical current reading associated with the blade motor; and
controlling a movement speed of the safety guard toward the rotating circular blade based at least in part on the electrical current reading.

7. The method of medical treatment of claim 6, wherein said controlling the movement speed of the safety guard toward the rotating circular blade comprises increasing the movement speed of the safety guard toward the rotating circular blade in response to determining that the electrical current reading is below a predetermined lower threshold value.

8. The method of medical treatment of claim 6, wherein said controlling the movement speed of the safety guard toward the rotating circular blade comprises decreasing the movement speed of the safety guard toward the circular blade in response to determining that the electrical current reading exceeds a predetermined upper threshold value.

9. The method of medical treatment of claim 1, wherein said transecting comprises advancing a peripheral edge of the circular blade through a thickness of the portion of the ring.

10. The method of medical treatment of claim 1, further comprising:
   triggering a cutting fluid indicator; and
   after said triggering, applying cutting fluid to one or more of the ring and the circular blade.

11. The method of medical treatment of claim 10, wherein:
   said triggering comprises the one or more processors collectively:
      activate the cutting fluid indicator based at least in part on the position signals from the guard position sensor.

* * * * *